(12) United States Patent
Hattori et al.

(10) Patent No.: US 8,199,213 B2
(45) Date of Patent: Jun. 12, 2012

(54) METHOD FOR SELECTING DESIRABLE IMAGES FROM AMONG A PLURALITY OF IMAGES AND APPARATUS THEREOF

(75) Inventors: Hideaki Hattori, Kawasaki (JP); Toshiyuki Fukui, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 405 days.

(21) Appl. No.: 12/504,879

(22) Filed: Jul. 17, 2009

(65) Prior Publication Data

US 2010/0020224 A1    Jan. 28, 2010

(30) Foreign Application Priority Data

Jul. 24, 2008  (JP) ................................ 2008-191304

(51) Int. Cl.
*H04N 5/228* (2006.01)
(52) U.S. Cl. ..................................... 348/222.1; 382/305
(58) Field of Classification Search .................. None
See application file for complete search history.

(56) References Cited

U.S. PATENT DOCUMENTS

| | | | |
|---|---|---|---|
| 2003/0059121 A1* | 3/2003 | Savakis et al. ................ 382/239 |
| 2003/0068100 A1* | 4/2003 | Covell et al. .................. 382/305 |
| 2003/0081249 A1* | 5/2003 | Ahmad et al. ............... 358/1.15 |
| 2004/0088723 A1* | 5/2004 | Ma et al. ......................... 725/19 |
| 2004/0136460 A1* | 7/2004 | Zhang et al. ............. 375/240.16 |
| 2005/0105803 A1* | 5/2005 | Ray ................................ 382/209 |
| 2006/0280427 A1* | 12/2006 | Snowdon et al. ............... 386/46 |
| 2006/0288288 A1* | 12/2006 | Girgensohn et al. .......... 715/716 |
| 2007/0132874 A1* | 6/2007 | Forman et al. ........... 348/333.02 |
| 2007/0182861 A1* | 8/2007 | Luo et al. ...................... 348/700 |
| 2009/0290037 A1* | 11/2009 | Pore .......................... 348/222.1 |

FOREIGN PATENT DOCUMENTS

| | | |
|---|---|---|
| JP | 2004-46591 A | 2/2004 |
| JP | 2006-217510 A | 8/2006 |

* cited by examiner

*Primary Examiner* — Lin Ye
*Assistant Examiner* — Dennis Hogue
(74) *Attorney, Agent, or Firm* — Canon USA, Inc. IP Division

(57) ABSTRACT

An image processing method includes calculating a desirability score which indicates a desirability of the image, for each of a series of images captured in a time-sequential manner, based on a recognition result of the image, and selecting a plurality of images as best-shots in which desirability scores are a local maximum value in a time-sequence, from the series of images.

10 Claims, 16 Drawing Sheets

FIG.3

<310: IMAGE INFORMATION TABLE>

| TIME | SMILE SCORE (WEIGHT: 3) | NUMBER OF PERSONS SCORE (WEIGHT: 2) | FRONTALITY SCORE (WEIGHT: 1) | DESIRABILITY SCORE |
|---|---|---|---|---|
| 1 | 0 | 10 | 40 | 60 |
| 2 | 20 | 10 | 40 | 120 |
| 3 | 60 | 10 | 40 | 240 |
| 4 | 40 | 20 | 20 | 180 |
| 5 | 40 | 20 | 20 | 180 |
| 6 | 20 | 20 | 20 | 120 |
| 7 | 10 | 20 | 30 | 100 |
| 8 | 30 | 20 | 30 | 160 |
| 9 | 60 | 20 | 30 | 250 |
| 10 | 80 | 20 | 40 | 320 |
| 11 | 90 | 20 | 40 | 350 |
| 12 | 80 | 20 | 40 | 320 |
| 13 | 70 | 20 | 40 | 290 |
| 14 | 70 | 20 | 30 | 280 |
| 15 | 50 | 10 | 30 | 200 |
| 16 | 20 | 10 | 30 | 110 |
| 17 | 20 | 10 | 30 | 110 |
| 18 | 40 | 10 | 30 | 170 |
| 19 | 30 | 10 | 30 | 140 |
| 20 | 40 | 10 | 30 | 170 |
| 21 | 50 | 10 | 30 | 200 |
| 22 | 60 | 10 | 30 | 230 |
| 23 | 50 | 10 | 30 | 200 |
| 24 | 80 | 10 | 20 | 280 |
| 25 | 50 | 10 | 20 | 190 |
| 26 | 70 | 10 | 20 | 250 |
| 27 | 50 | 10 | 20 | 190 |
| 28 | 40 | 10 | 20 | 160 |

<320: BEST SHOT TABLE (THRESHOLD VALUE FOR DESIRABILITY SCORE = 200, THRESHOLD VALUE FOR TIME INTERVAL = 3)>

| TIME | SMILE SCORE | NUMBER OF PERSONS SCORE | FRONTALITY SCORE | DESIRABILITY SCORE |
|---|---|---|---|---|
| 3 | 60 | 10 | 40 | 240 |
| 11 | 90 | 20 | 40 | 350 |
| 24 | 80 | 10 | 20 | 280 |

THOUGH LOCAL MAXIMUM VALUE, NOT REGISTERED AS BEST SHOT, BECAUSE NOT GREATER THAN THRESHOLD VALUE FOR DESIRABILITY SCORE

THOUGH ONCE REGISTERED AS BEST SHOT, INFORMATION OF BEST SHOT TABLE WAS OVERWRITTEN WITH INFORMATION OF TIME 24, BECAUSE TIME INTERVAL WAS SMALLER THAN THRESHOLD VALUE AND DESIRABILITY SCORE WAS SMALL

THOUGH LOCAL MAXIMUM VALUE, NOT REGISTERED AS BEST SHOT, BECAUSE TIME INTERVAL WAS SMALLER THAN THRESHOLD VALUE AND DESIRABILITY SCORE WAS SMALL

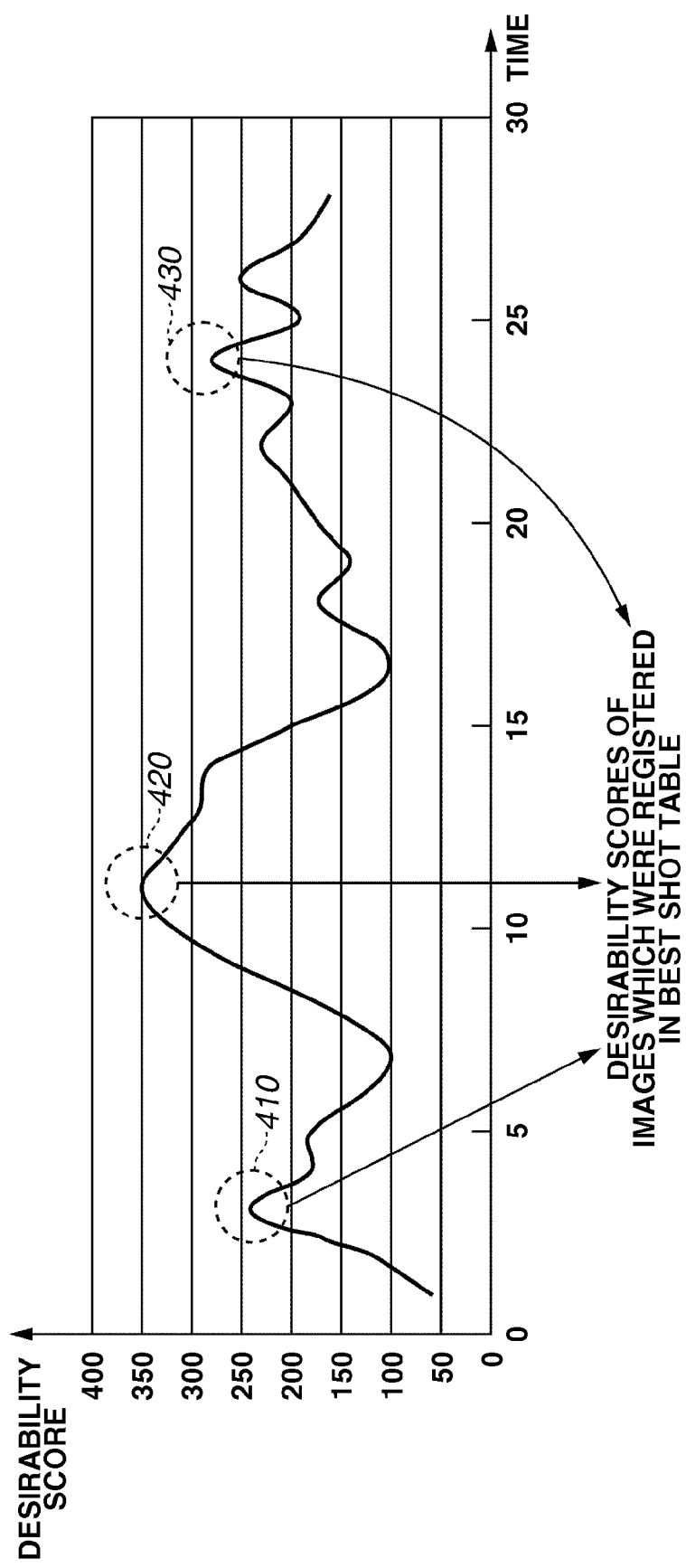

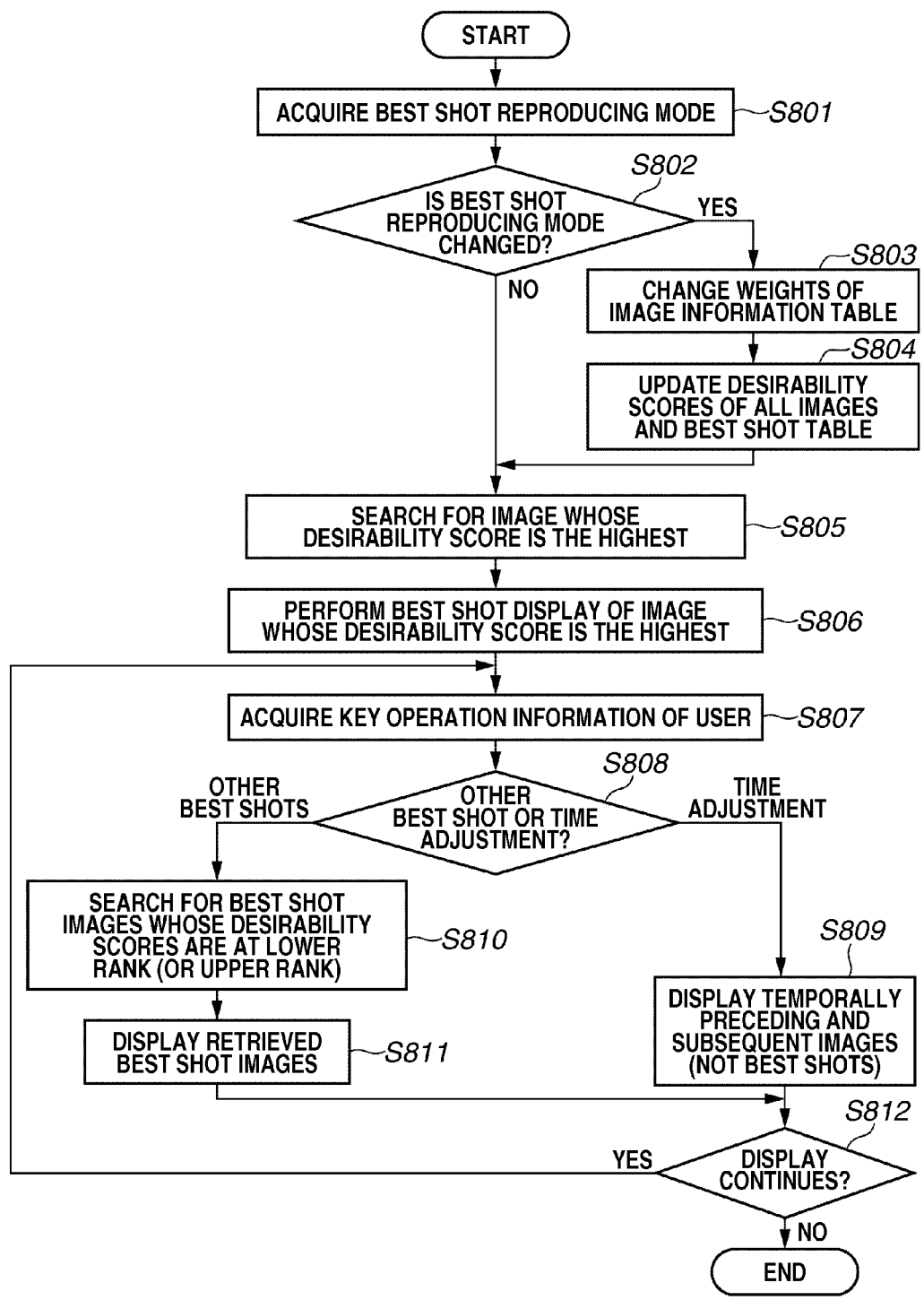

FIG.9

<910: IMAGE INFORMATION TABLE>

| TIME | SMILE SCORE (WEIGHT: 0) | NUMBER OF PERSONS SCORE (WEIGHT: 0) | FRONTALITY SCORE (WEIGHT: 0) | PARTICULAR PERSON'S SIZE SCORE (WEIGHT: 1) | PARTICULAR PERSON'S SMILE SCORE (WEIGHT: 2) | DESIRABILITY SCORE |
|---|---|---|---|---|---|---|
| 1 | 0 | 10 | 40 | 0 | 0 | 0 |
| 2 | 20 | 10 | 40 | 0 | 0 | 0 |
| 3 | 60 | 10 | 20 | 0 | 0 | 0 |
| 4 | 40 | 20 | 20 | 0 | 0 | 0 |
| 5 | 40 | 20 | 20 | 0 | 0 | 0 |
| 6 | 20 | 20 | 30 | 10 | 0 | 10 |
| 7 | 70 | 20 | 30 | 10 | 0 | 10 |
| 8 | 80 | 20 | 30 | 10 | 0 | 10 |
| 9 | 60 | 20 | 20 | 10 | 0 | 10 |
| 10 | 80 | 20 | 40 | 10 | 10 | 40 |
| 11 | | | | 20 | 20 | 60 |
| 12 | | | | 20 | 30 | 80 |
| 13 | | | | 20 | 30 | 60 |
| 14 | | | | 30 | 20 | 50 |
| 15 | | | | 30 | 10 | 50 |
| 16 | | | | 30 | 0 | 30 |
| 17 | | | | 30 | 30 | 90 |
| 18 | 40 | 10 | 30 | 40 | 30 | 100 |
| 19 | 30 | 10 | 30 | 40 | 30 | 100 |
| 20 | 40 | 10 | 30 | 50 | 30 | 110 |
| 21 | 50 | 10 | 30 | 40 | 30 | 100 |
| 22 | 60 | 10 | 20 | 30 | 30 | 90 |
| 23 | 50 | 10 | 20 | 30 | 20 | 70 |
| 24 | 80 | 10 | 20 | 30 | 0 | 30 |
| 25 | 50 | 10 | 20 | 30 | 0 | 30 |
| 26 | 70 | 10 | 20 | 0 | 0 | 0 |
| 27 | 50 | 10 | 20 | 0 | 0 | 0 |
| 28 | 40 | 10 | 20 | 0 | 0 | 0 |

NOT REFLECTED IN DESIRABILITY SCORE IN PARTICULAR PERSON MODE OWING TO WEIGHT 0

<920: BEST SHOT TABLE (IN PARTICULAR PERSON DISPLAY MODE)>

| TIME | PARTICULAR PERSON'S SIZE SCORE | PARTICULAR PERSON'S SMILE SCORE | DESIRABILITY SCORE |
|---|---|---|---|
| 13 | 20 | 30 | 80 |
| 21 | 50 | 30 | 110 |

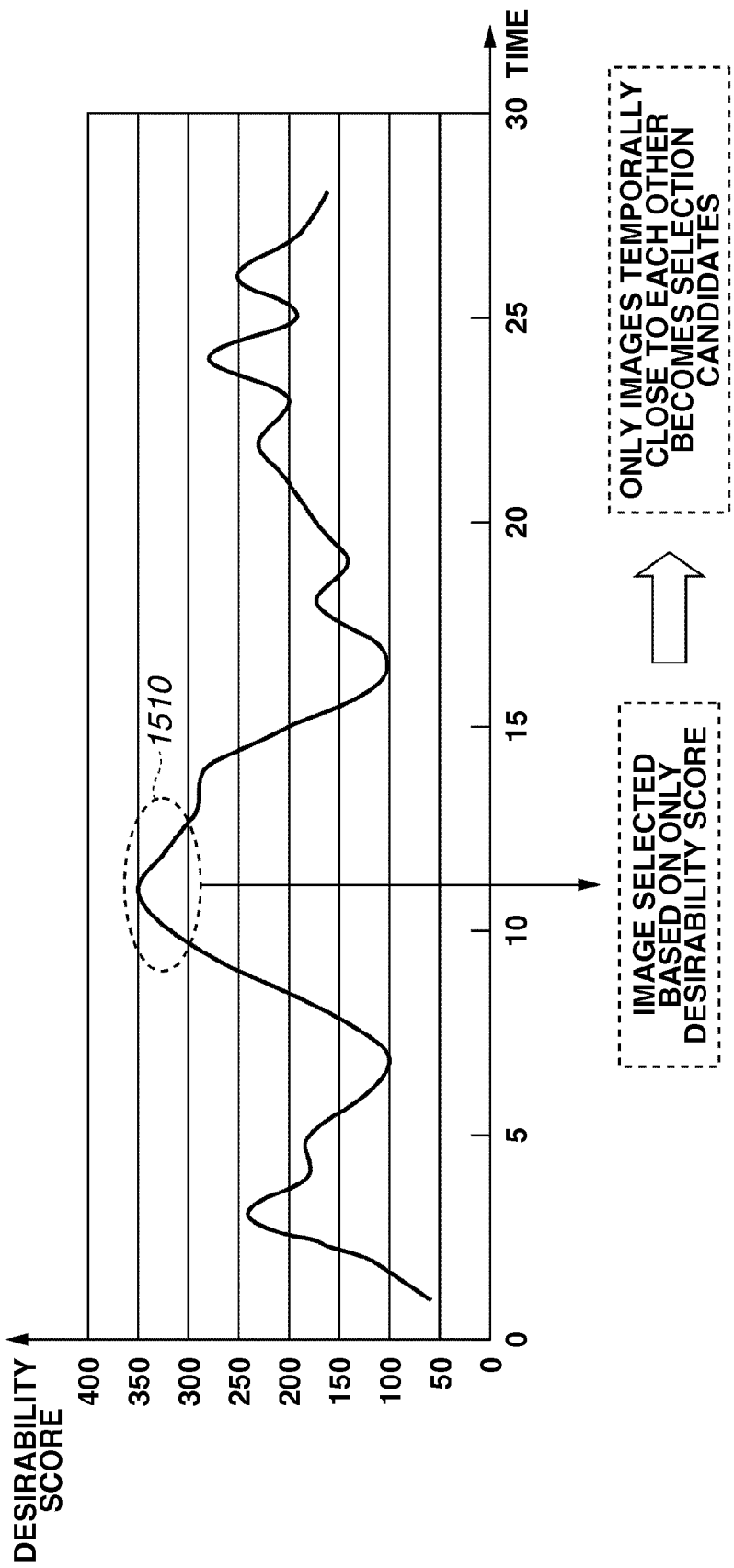

METHOD FOR SELECTING DESIRABLE IMAGES FROM AMONG A PLURALITY OF IMAGES AND APPARATUS THEREOF

BACKGROUND OF THE INVENTION

1. Field of the Invention

The present invention relates to an image processing method for selecting desirable images from among a plurality of images and to an apparatus thereof.

2. Description of the Related Art

In recent years, multi-functionalization of digital cameras are remarkable, in particular, digital cameras for a high speed continuous shooting have come into wide use. Such cameras perform a high speed continuous shooting within a predetermined time period, so that users won't miss defining shutter scenes. Further, recognition functions represented by face recognition and smile recognition and so forth have been also put to practical use, and have been widely adopted in the digital cameras. The recognition functions are capable of high speed processing, and development processing can be performed depending on the recognition processing and recognition results with respect to each image obtained by the high speed continuous shooting. Further, developed images are efficiently saved on a recording medium such as a flash memory by compressing the developed images in Joint Photographic Experts Group (JPEG) format or the like.

Further, as general functions of the digital cameras, captured images can be selected by a key operation or the like and displayed on a liquid crystal panel of a digital camera to confirm image qualities and desirability of the images. However, in the digital cameras provided with the high speed continuous shooting functions as described above, images to be captured amount to a very large number of frames, for instance, over several hundreds.

Therefore, a great many operations will be needed until reaching best-shots (desirable images) when a method for simply displaying captured images in a time-sequential manner is used like the conventional digital cameras. Furthermore, generally, there exist best-shots in a plurality of frames rather than in one frame out of a series of captured images. Hence, for the purpose of enhancing convenience of users, a function to automatically select such a plurality of frames of best-shots has been demanded.

Conventionally, for the purpose of an automatic selection of such best-shots, a method to utilize recognition scores recorded as additional information of images is employed. For instance, as an image selection technique using such recognition scores or the like, captured face images of photo-taken persons are extracted to make smile evaluation and propriety evaluation for each face image, and subsequently the images are displayed in a decreasing order of overall evaluation values (See, for instance, Japanese Patent Application Laid-Open No. 2004-46591). Further, in order to prevent similar images from becoming display targets when displaying a plurality of images, a degree of coincidence with newly read images for display is determined, and only images with a low degree of coincidence are displayed on a liquid crystal monitor (See, e.g., Japanese Patent Application Laid-Open No. 2006-217510).

FIG. 15 illustrates an example of desirability scores in a time-sequence used in a conventional best-shot selection method. In the conventional best-shot selection method, images are selected in a decreasing order of the desirability scores (recognition scores). In this method, as illustrated in FIG. 15, only images contained in an temporally close image group 1510 become selection targets. For a user, only one frame of best-shot chosen from an image group (image group having substantially the similar contents) that is taken at very close shooting times is enough. Thus, there is a need to find another best-shots from an image group (image group having different contents) taken at separate shooting times, even if the recognition score is somewhat low. However, in the conventional best-shot selection method as described above, there is a problem that many operations are required before reaching another best-shots which are different in contents, and have high recognition scores. On the other hand, in the conventional technique to simply display only images whose degrees of coincidence with already displayed images are low, even images with low recognition scores become the display targets, thus the display candidates become too many.

SUMMARY OF THE INVENTION

The present invention is directed to an image processing apparatus that can efficiently select a plurality of best-shot images with different contents from among a plurality of images.

According to an aspect of the present invention, an image processing apparatus includes a storage unit configured to store a plurality of images captured in a time-sequential manner, and image information including recognition scores obtained by recognition processing of each of the images and information of shooting time, a calculation unit configured to calculate desirability scores indicating desirabilitys of the images using the recognition scores for each of the plurality of images, a setting unit configured to set a predetermined time interval within a range of the time-sequence, and a selection unit configured to select a predetermined image from among the plurality of images, using information of the desirability scores, the predetermined time interval and the shooting time.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 3 illustrates an example of an image information table obtained during image capturing, and a best-shot table.

FIG. 4 illustrates an example of desirability scores in a time-sequence.

FIG. 8 is a flowchart illustrating an example of an image display processing of a digital camera according to the first exemplary embodiment.

FIG. 9 illustrates an example of an image information table and a best-shot table associated with a particular person.

FIG. 15 illustrates an example of desirability scores in a time-sequence.

DETAILED DESCRIPTION OF THE EMBODIMENTS

Various exemplary embodiments, features, and aspects of the present invention will now be herein described in detail below with reference to the drawings. It is to be noted that the relative arrangement of the components, the numerical expressions, and numerical values set forth in these embodiments are not intended to limit the scope of the present invention.

Figure 1:
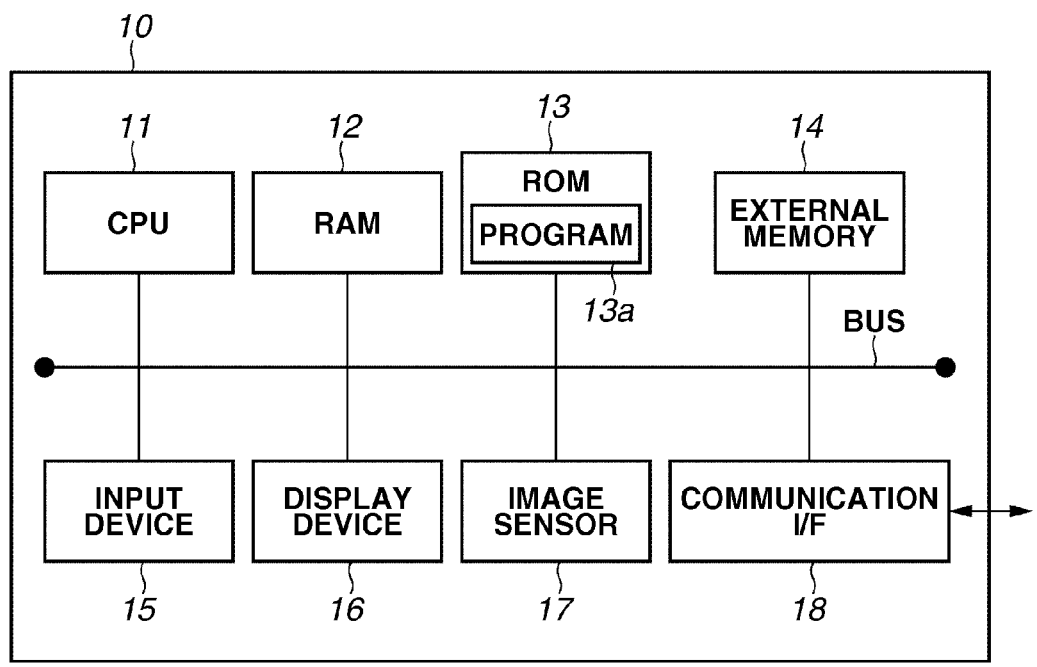
FIG. 1 illustrates an example of hardware configuration of an image processing apparatus according to a first exemplary embodiment.

FIG. 1 illustrates an example of hardware configuration of an image processing apparatus 10 according a first exemplary embodiment. As illustrated in FIG. 1, the image processing apparatus 10 includes a central processing unit (CPU) 11, a random-access memory (RAM) 12, a read-only memory (ROM) 13, an external memory 14, an input device 15, an display device 16, an imaging sensor 17, a communication interface (hereinafter referred to as communication I/F) 18, and a bus. In other words, the image processing apparatus 10 also operates as an imaging apparatus such as a digital camera.

The task of the CPU 11 is to control an operation comprehensively in the image processing apparatus 10, and controls respective components 12 to 18 of the image processing apparatus 10 via a bus.

The RAM 12 operates as a main memory, a work area, and the like of the CPU 11. The CPU 11 loads necessary program 13a and the like on the RAM 12 from the ROM 13 when executing processing, and executes the program 13a and the like to implement various operations.

The ROM 13 stores the program 13a and the like necessary for the CPU 11 to execute the processes of FIGS. 2A and 2B, FIG. 8 and FIG. 13 as described below. Alternatively, the program 13a may be stored in the external memory 14.

In the external memory 14, for instance, various data and files, information which will be necessary when the CPU 11 performs processing using the program 13a and the like are stored. Further, in the external memory 14, for instance, various data and files, information obtained by the CPU 11 in performing the processing using the program 13a or the like are stored.

The input device 15 includes, for instance, an operation button and a touch panel, via which a user inputs instructions to the image processing apparatus 10. The display device 16 includes, for instance, a liquid crystal display device and organic electroluminescence (EL) display device, and displays various data and information and the like under control of the CPU 11.

The imaging sensor 17 receives light (more specifically, an optical image of an object) entering from the outside of the image processing apparatus 10, and picks up the optical image as an electric image signal. The communication I/F 18 governs a communication with the external devices. The bus is a device to connect the CPU 11, the RAM 12, the ROM 13, the external memory 14, the input device 15, the display device 16, the imaging sensor 17, and the communication I/F 18 for communication with one another.

Figure 2A:
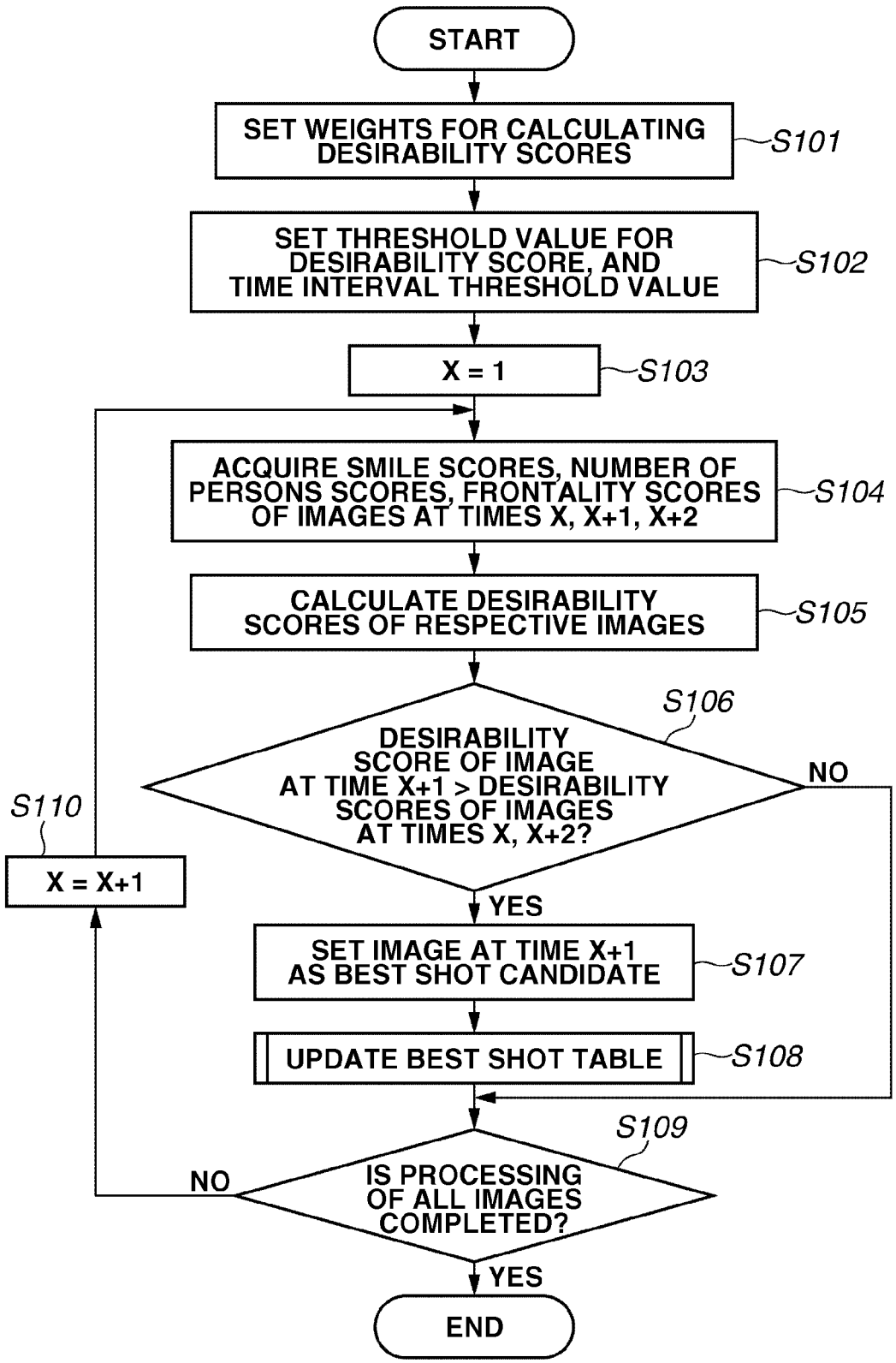
FIGS. 2A and 2B are flowcharts illustrating an example of an image selection processing.

Next, the processing procedure in the image processing apparatus 10 will be described below. FIG. 2A is a flowchart illustrating an example of procedure of the image selection processing of the image processing apparatus 10 according to the first exemplary embodiment. The processing of the flowchart as illustrated in FIG. 2A is performed by, for instance, the CPU 11 executing the program 13a stored in the ROM 13.

Further, FIG. 3 illustrates an example of an image information table 310 obtained during image capturing, and a best-shot table 320 created by the processing as illustrated in FIG. 2A. The image information table 310 and the best-shot table 320 as illustrated in FIG. 3 are stored, for instance, in the external memory 14.

Now, first, FIG. 3 will be described. As illustrated in FIG. 3, in the present exemplary embodiment, respective pieces of information about shooting time, and smile scores, number of persons scores, frontality scores, which are face recognition results extracted from images, and desirability scores of captured image groups are set as the image information table 310. In the following description, the smile scores, the number of persons scores and the frontality scores are collectively referred to as "face recognition scores".

The smile score of the image information table 310 quantitatively indicates how much smile an object has, whose face was recognized by the recognition. When no smile is on his or her face, the value of "0" is assigned, and as to full smile, the value of "100" is assigned. In addition, when a plurality of persons becomes objects, an average of smile scores of all objects is calculated.

The number of persons scores of the image information table 310 indicate the number of objects which were recognized as faces within an image by the recognition. The more the number of persons, the larger the value becomes. Further, in the present exemplary embodiment, the calculation of the number of persons scores can be performed more properly by excluding the objects (human objects) that closes their eyes from the number of persons scores.

The frontality scores of the image information table 310 indicate to what degree each object face-recognized by the recognition is frontal relative to the image processing apparatus 10. More specifically, the frontality score takes a larger value when an object faces to a front more squarely, and when an object faces just sideways such that face is recognized with difficulty, the value becomes "0". These face recognition score is, basically, calculated during image capturing, but is also applicable in calculating the value with respect to, for instance, images which have been already recorded.

Further, the present exemplary embodiment illustrates an application to a particular face recognition algorithm that is capable of calculating the above-described face recognition scores. The present invention, however, is not limited thereto. In other words, the present invention is not intended to rely on the particular face recognition algorithm, but it is possible to apply the present exemplary embodiment to any face recognition algorithm that can quantitatively demonstrate face recognition results.

In the present exemplary embodiment, desirability scores are calculated by performing weighting of these face recognition scores and then additions, and selection of images is performed by using these desirability scores. In FIG. 3, an example of calculating desirability scores is illustrated, in which the weight of smile scores is 3, the weight of the number of persons scores is 2, the weight of the frontality scores is 1, for calculation of the desirability scores. In addition, the weighting to be used when calculating the desirability scores can be customized, for instance, by a user providing input instructions via the input device 15. It is important that the weight of smile scores can be increased, for instance, for images at leisure time. In group photos, since as many objects as possible should be face-recognized, the weight of the number of persons scores can be increased.

Next, a flowchart as illustrated in FIG. 2A will be described. First, in the preceding stage of the process as illustrated in FIG. 2A, the CPU 11 stores a plurality of images (moving images) captured in a time-sequential manner by the imaging sensor 17, and image information including information of the face recognition scores obtained by the image recognition for each image and information of shooting time in the external memory 14.

Then, in step S101 of FIG. 2A, when a user inputs weights to create the best-shot table via the input device 15, the CPU 11 performs weighting. More specifically, in step S101, the weights (i.e., weights of the smile scores, the number of persons scores and the frontality scores) are assigned for calculations of the desirability scores of the image information table 310. The weights are used when creating the best-shot table 320 as illustrated in FIG. 3. For instance, in the example as illustrated in FIG. 3, the weight of the smile scores has been set to 3, the weight of the number of persons scores to 2, the weight of the frontality scores to 1, as described above.

Then, in step S102, for instance, when a user inputs threshold values for desirability scores and time intervals serving as parameters used when updating the best-shot table via the input device 15, the CPU 11 sets the threshold values. In this process, the threshold value for time intervals is used, in a plurality of images (moving images) captured in a time-sequential manner, for defining a predetermined time interval set within a range of the time-sequence.

Then, in step S103, the CPU 11 sets a variable X indicating time of an image target to be processed to 1. Thus, the time X of the image target to be processed is set. In this process, this time corresponds to, for instance, time in the image information table 310 as illustrated in FIG. 3. Further, on this occasion, for instance, the time of the final image (e.g. the time 28 in the example as illustrated in FIG. 3) to be processed is set.

Then, in step S104, the CPU 11 acquires face recognition scores such as the smile scores, the number of persons scores, the frontality scores of three image frames (times X, X+1, X+2) which are temporally consecutive, from the image information table 310.

Then, in step S105, the CPU 11 performs weighted addition of the face recognition scores, for each image, using the weights which have been set in step S101 to calculate desirability scores in the image information table 310 as illustrated in FIG. 3.

Then, in step S106, the CPU 11 determines whether a desirability score of an image at the mid-time (time X+1) is larger than desirability scores of the preceding and subsequent images in terms of time (times X, X+2) relative to the image. More specifically, in step S106, it is determined whether a desirability score at a time X+1 which is the mid-time, is a local maximum value in a time-sequence.

If a desirability score of an image at the mid-time is larger than desirability scores of the preceding and subsequent images (e.g., the desirability score at the mid-time is a local maximum value) as the result of determination of step S106, (YES in step S106), the process proceeds to step S107. In step S107, the CPU 11 sets an image at the mid-time (time X+1) as an image of a best-shot candidate.

Next, in step S108, the CPU 11 evaluates an image of the best-shot candidate set in step S107, then compares it with data of the existing best-shot table 320, and after that, updates the best-shot table 320. The details of the process of the step S108 will be described below with reference to FIG. 2A.

Upon completion of an update of step S108, the process proceeds to step S109. Further, if it is determined that a desirability score of an image at the mid-time in step S106 is not a local maximum value (NO in step S106), the image at the mid-time (time X+1) is not registered in the best-shot table 320, and the process proceeds to step S109.

In step S109, the CPU 11 determines whether the processing of all images is completed. For instance, in the example as illustrated in FIG. 3, it is determined whether the processing of all images from time 1 to time 28 is completed. At this time, it is determined whether the processing of all images is completed, depending on whether, for instance, current time X of the target image to be processed has reached time of the final image set in step S103.

If the processing for all images has not yet been completed as the result of determination of step S109, (i.e., some images which have not yet been processed are present) (NO in step S109), the process proceeds to step S110. In step S110, the CPU 11 adds 1 to a variable X which indicates time of a target image to be processed, to update time X of the target image to be processed. Then, the processes of step S104 and later are performed again with respect to the image of the updated time X. On the other hand, if the processing of all images has been completed as the result of determination of step S109, (YES in step S109), the processing of the flowchart ends.

Figure 2B:
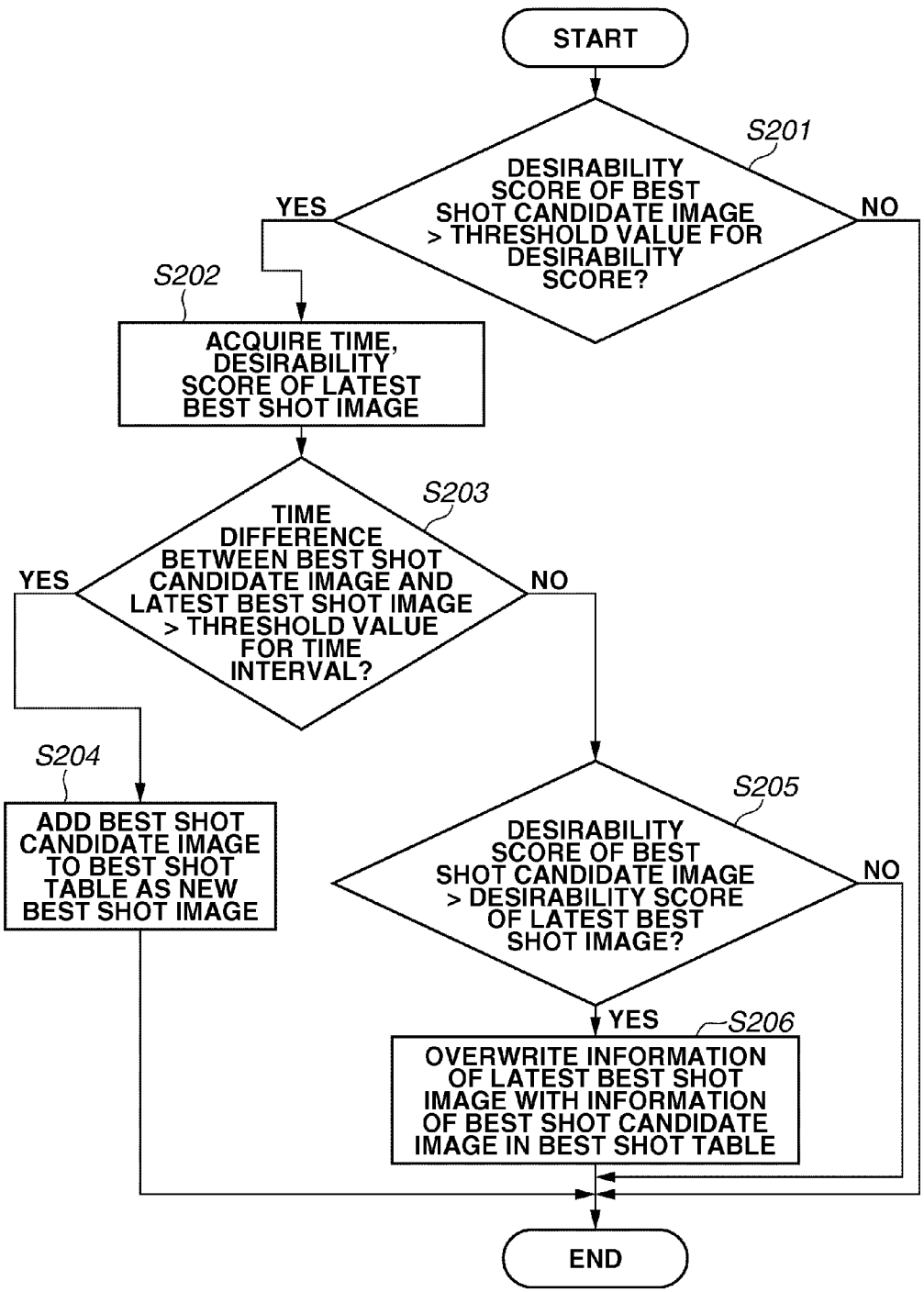

Next, detailed processing in step S108 of FIG. 2A will be described. FIG. 2B is a flowchart illustrating an example of the detailed processing for updating the best-shot table in step S108 of FIG. 2A.

First, in step S201, the CPU 11 determines whether a desirability score of a best-shot candidate image set as the processing target in step S107 is larger than the threshold value for desirability scores which has been set in step S102.

If a desirability score of the best-shot candidate image of the processing target as the result of determination of step S201, is not larger than the threshold value for desirability scores (namely, equal to or less than the threshold value) (NO in step S201), the process ends without registering the best-shot candidate image as the best-shot. In step S107, even if an image has a very low desirability score, the image would end up being determined as a best-shot candidate image, so long as it shows a local maximum value. However, the best-shot candidate image with such a low desirability score will not be registered as the best-shot image by this processing.

On the other hand, if a desirability score of the best-shot candidate image of the processing target is larger than the threshold value for desirability scores as the result of determination of step S201 (YES in step S201), the process proceeds to step S202. In step S202, the CPU 11 acquires the latest information of the best-shot images (more specifically, information of time and information of desirability scores) from the best-shot table 320. Next, in step S203, the CPU 11 determines whether a time difference between a best-shot candidate image of a processing target and a latest best-shot image is larger than a threshold value for time intervals which has been set in step S102.

A fluctuation of desirability scores may include high-frequency components when the local maximum value similar to the present exemplary embodiment is utilized. The reason that an evaluation of the time difference is performed in the step S203 is because, in the above case, a great many local maximum values are generated in a short time period, and the best-shots would be generated in a large quantity (redundantly) Samples of the desirability scores which contain high-frequency components are present between times 21 and 26 of the image information table 310 of FIG. 3. When the best-shots would have been redundantly generated, its effectiveness would be impaired. Accordingly, in the present exemplary embodiment, if a plurality of local maximum values are generated in a short time period, only an image whose desirability score is the greatest is registered as the best-shot image.

If a time difference between the best-shot candidate image of the processing target and the latest best-shot image is larger than the threshold value for time intervals set in step S102 as the result of determination of step S203 (YES in step S203), then the process proceeds to step S204 because time is sufficiently separate.

In step S204, the CPU 11 registers the best-shot candidate image of the processing target as a new best-shot image. More specifically, in this process, an update of the best-shot table 320 is performed by adding a new line to the best-shot table 320, and registering information associated with the best-shot candidate image of the processing target with the line (information of times, face recognition scores, desirability scores). After that, the process ends.

On the other hand, if a time difference between the best-shot candidate image of the processing targets and the latest best-shot image is not larger than the threshold value for time intervals set in step S102, as the result of determination of step S203 (i.e., equal to or less than the threshold value) (NO in step S203), the process proceeds to step S205. In step S205, the CPU 11 determines whether a desirability score of the best-shot candidate image of the processing target is larger than a desirability score of the latest best-shot image acquired in step S202. If a desirability score of the best-shot candidate image of the processing target is larger than a desirability score of the latest best-shot image as the result of determination of step S205 (YES in step S206), the process proceeds to step S206.

In step S206, the CPU 11 overwrites information about the latest best-shot image with information (information of times, face recognition scores, desirability scores) about the best-shot candidate image of the processing target, to register the best-shot candidate image as a new best-shot image. Thus, the update of the best-shot table 320 is performed. As a result, the latest best-shot image before updating will go out of the best-shot table 320. After that, the process ends.

On the other hand, if a desirability score of the best-shot candidate image of the processing target is not larger than a desirability score of the best-shot image as the result of determination of step S205 (i.e., equal to or less than the threshold value) (NO in step S205), the process ends. More specifically, in this case, the best-shot candidate image of the processing target is not registered in the best-shot table 320.

The update of the best-shot table in step S108 of FIG. 2A is carried out by performing the processes of steps S201 to S206 as described above. In other words, the CPU 11 selects a best-shot image from among a plurality of images captured in a time-sequential manner, using information of desirability scores, threshold values for time intervals and shooting time. Further, the CPU 11 preferentially selects an image in which a desirability score is a local maximum value in a time-sequence, as the best-shot image, when performing the selection.

FIG. 4 is a view for describing a method for selecting a best-shot according to the first exemplary embodiment, and illustrates an example of desirability scores in a time-sequence. In the present exemplary embodiment, as illustrated in FIG. 4, images (410, 420, and 430) in which shooting time is separated from each other at a time interval that is equal to or more than a predetermined value, are selected as the best-shot images.

In FIG. 3 (and FIG. 4), the desirability score of an image at the time of 18 is 170, which is a local maximum value, but equal to or less than threshold value for desirability scores (set to 200 in the example). Accordingly, it is not registered as the best-shot.

Further, the desirability score of the image at the time of 22 is 230, which was, once, registered in the best-shot table 320 as the best-shot. However, after that, as to the image at the time of 24, the local maximum value of the desirability score of 280 is detected. Since the time interval is not greater than its threshold value (in the present example it was set to 3), the image at the time of 22 is overwritten by the image information at the time of 24, and cut out of the best-shot table 320. From the similar reason, the image at the time of 26 is not registered as the best-shot.

In this way, in the present exemplary embodiment, redundant best-shots can be omitted by using the threshold value for desirability scores and the threshold value for time intervals, instead of using simply the local maximum value. As a consequence, only images whose time difference between the best-shots is sufficient (there is sufficient difference between the contents of the images) and whose desirability scores are high can be properly selected as the best-shot images.

The threshold value for desirability scores and the threshold value for time intervals as described above can be customized by a speed of continuous shooting and shooting time. Further, if a user wants to extract more best-shots (want to increase frequency of occurrence of best-shots) from the same number of image frames, it can be easily achieved by decreasing the values of the threshold value for desirability scores, and the threshold value for time intervals.

In addition, while a threshold value for time intervals is used in the present exemplary embodiment, as measures against high-frequency components of desirability scores, similar effects can be obtained, for instance, by applying a low-pass filtering process to a time-sequential fluctuation of the desirability scores. When the low-pass filter is applied, the number of best-shot image frames (frequency of occurrence) can be adjusted by customizing a filter-coefficient. Then, in this case, when best-shot images are selected, the desirability scores which have been subjected to the low-pass filtering process will be used.

In this way, a user who selects images can get access directly to best-shot images without checking all images which were captured, by creating and referring to the best-shot table 320.

Figure 5:
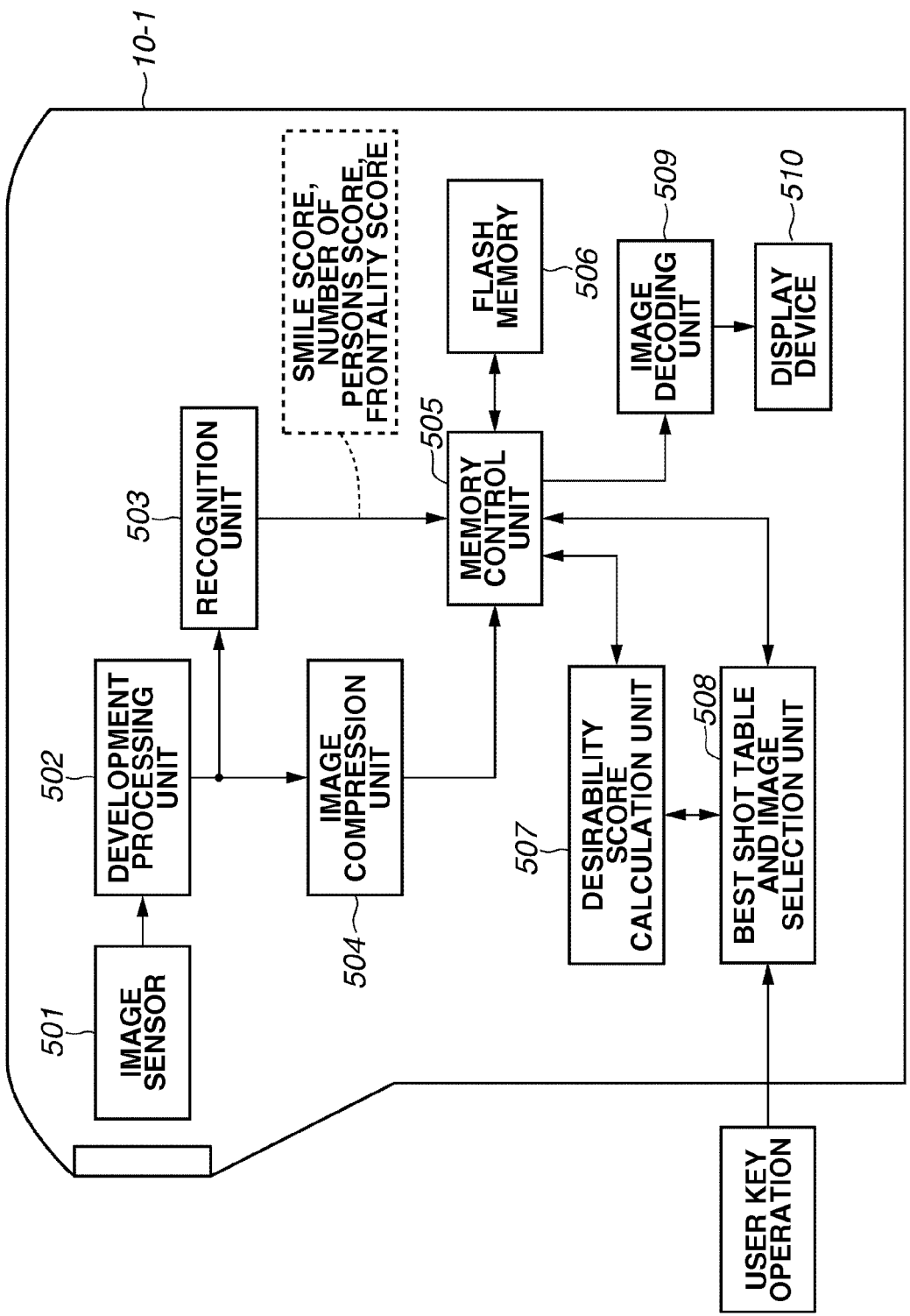
FIG. 5 illustrates an example of system configuration of a digital camera according to the first exemplary embodiment.

Next, an example in which a digital camera is employed as an image processing apparatus 10 as illustrated in FIG. 1 will be described below. FIG. 5 illustrates an example of system configuration of a digital camera 10-1 according to the first exemplary embodiment. As illustrated in FIG. 5, the digital camera 10-1 includes an imaging sensor 501, a development processing unit 502, a recognition unit 503, an image compression unit 504, a memory control unit 505, and a flash memory 506. Furthermore, the digital camera 10-1 includes a desirability score calculation unit 507, a best-shot table and image selection unit 508, an image decoding unit 509, and a display device 510.

In the system configuration, an imaging sensor 17 as illustrated in FIG. 1 corresponds to the imaging sensor 501 as illustrated in FIG. 5, and the display device 16 as illustrated in FIG. 1 corresponds to the display device 510 as illustrated in FIG. 5. Further, the development processing unit 502, the recognition unit 503, the image compression unit 504, the memory control unit 505, the desirability score calculation unit 507, and the image decoding unit 509 as illustrated in FIG. 5 are realized by, for instance, the CPU 11 as illustrated in FIG. 1 executing the program 13a of the ROM 13. Further, for instance, the external memory 14 of FIG. 1 is composed of the flash memory 506 of FIG. 5. Further, for instance, the best-shot table and image selection unit 508 of FIG. 5 are configured with the CPU 11 and the program 13a of the ROM 13 as illustrated in FIG. 1, and the external memory 14 and the input device 15.

Hereinbelow, respective components of FIG. 5 will be described. The imaging sensor 501 receives light entering from the outside of the digital camera 10-1 (more specifically, an optical image of an object), converts the light into an electric signal, which the imaging sensor 501 outputs as an image signal. The development processing unit 502 develops an image signal output from the imaging sensor 501, and generates an image which can be visually recognized by human beings.

The recognition unit 503 subjects respective image data which has been developed by the development processing unit 502, to the face recognition, and calculates smile scores, number of persons scores, frontality scores, and outputs these scores to the memory control unit 505. Further, the image compression unit 504 compresses by JPEG or the like images which have been developed by the development processing unit 502, and outputs them to the memory control unit 505.

The memory control unit 505 records images which have been compressed by the image compression unit 504 together with shooting time and face recognition scores as image information (additional information) thereof in the flash memory 506. The image information is recorded in a way as illustrated in the image information table 310 of FIG. 3.

The desirability score calculation unit 507 calculates desirability scores based on face recognition scores and weighting which has been preset, for each image recorded in the flash memory 506, under control of the memory control unit 505. Further, desirability scores calculated by the desirability score calculation unit 507 are set to the image information table 310 recorded in the flash memory 506, for each image, for instance, by the memory control unit 505.

The best-shot table and the image selection unit 508 creates the best-shot table 320, using the image selection algorithm as described above, based on each image information of the image information table 310 recorded in the flash memory 506, during image capturing or image display. Then, the best-shot table and image selection unit 508 retains the best-shot table 320 which it has created.

The image decoding unit 509 decodes images recorded in the flash memory 506, in accordance with the control of the memory control unit 505. The display device 510 displays images and the like decoded by the image decoding unit 509.

Figure 6:
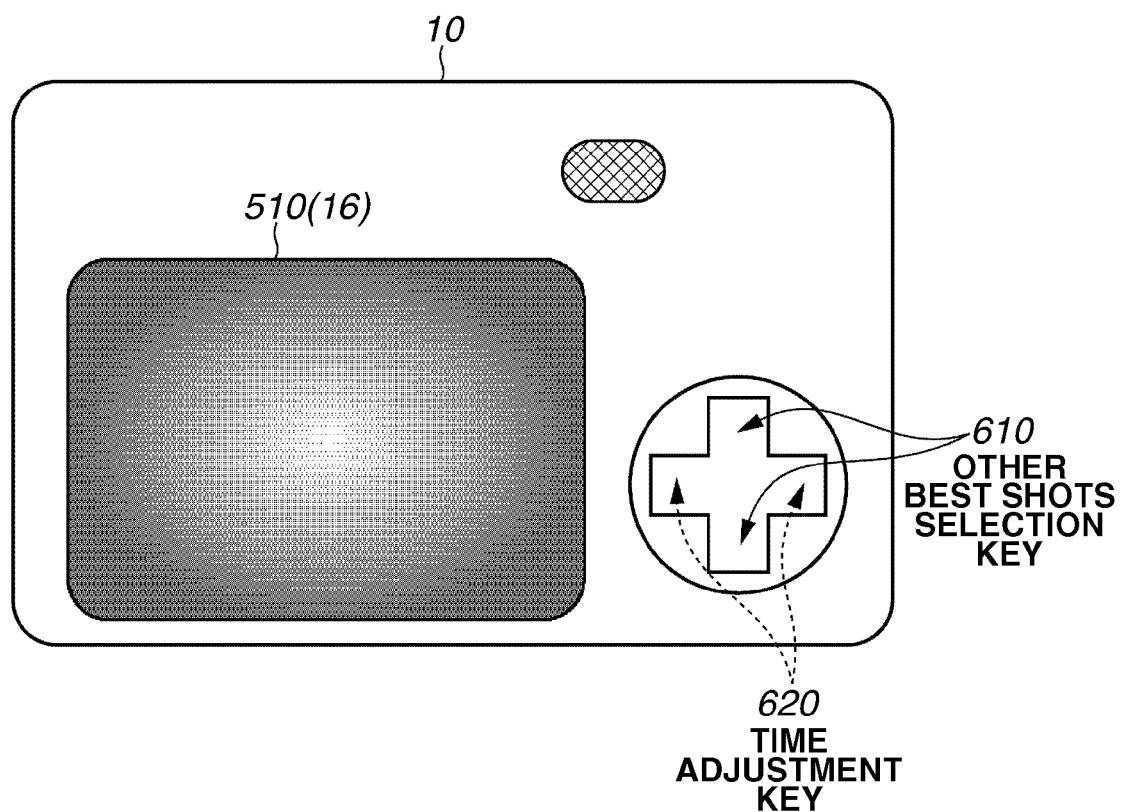
FIG. 6 illustrates an example of a user interface (an operation key or the like) of a digital camera according to the first exemplary embodiment.

FIG. 6 illustrates an example of a user interface of the digital camera 10-1 according to the first exemplary embodiment. In FIG. 6, two types of switches, i.e., a switch serving as other best-shots selection key 610, when displaying images, and a switch serving as a time adjustment key 620, and the display device 510 are illustrated.

Figure 7:
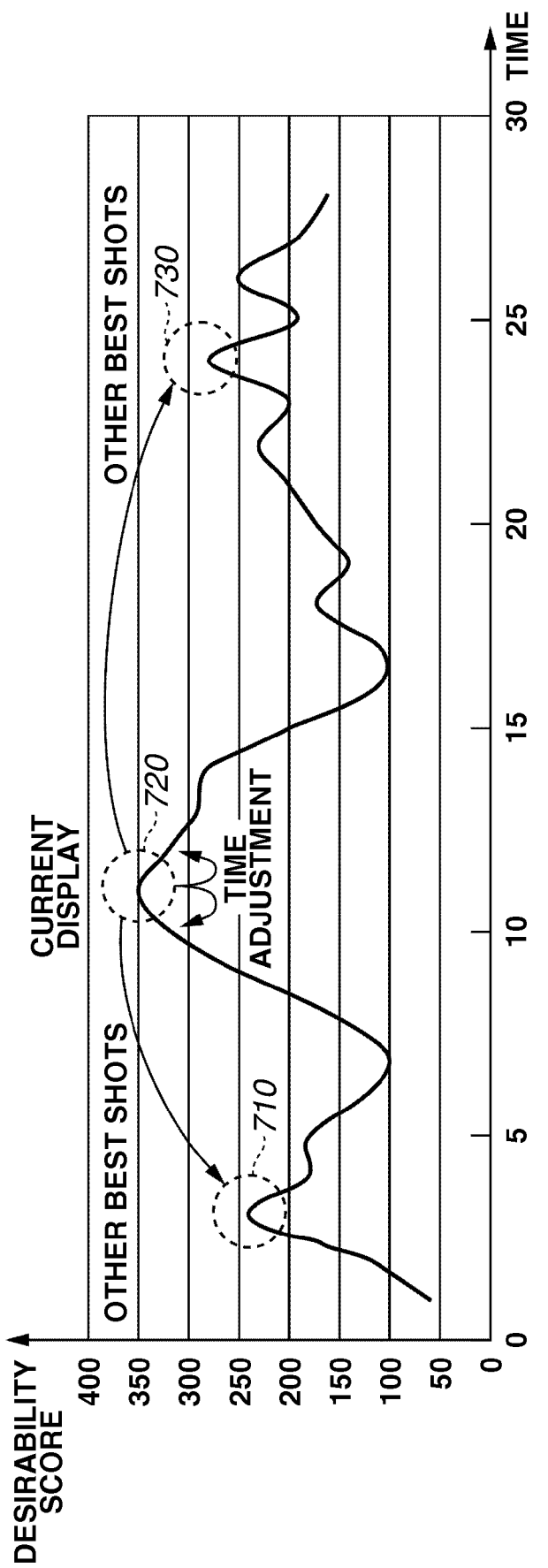
FIG. 7 illustrates an example of desirability scores in a time-sequence when a key operation is performed.

FIG. 7 illustrates an example of desirability scores in a time-sequence when the key operation as illustrated in FIG. 6 has been performed. When a user operates the other best-shots selection key 610 of FIG. 6, as illustrated in FIG. 7, images to be displayed is switched from a best-shot image 720 which is currently displayed to other best-shot image 710 or 730. On the other hand, when the user operates the time adjustment key 620, images to be displayed are switched from the best-shot image 720 which is currently displayed, to images at the preceding or the subsequent time relative to the time of the image.

In this way, since two types of operation keys are provided, the selection of a best-shot image, as well as the confirmation of the preceding and the subsequent images of the best-shot image can be easily performed. According to the above-described two types of key operations from the user, the best-shot table and image selection unit 508 determines images to be displayed by referring to the internal best-shot table, and outputs the results to the memory control unit 505. Then, the memory control unit 505 reads out images determined to be displayed from the flash memory 506, and outputs these images to the image decoding unit 509. The image decoding unit 509 subjects these images to JPEG decoding or the like, and outputs decoded images to the display device 510 (e.g., liquid crystal display device or organic EL display device) thereby performing image display.

FIG. 8 is a flowchart illustrating an example of the image display processing of the digital camera 10-1 according to the first exemplary embodiment. When a best-shot reproduction is selected by a user, first, in step S801 of FIG. 8, for instance, the best-shot table and image selection unit 508 acquires a best-shot reproduction mode which has been beforehand set by the user. Here, in addition to pre-defined modes such as a leisure mode, which attaches importance to smile scores, and a group photo mode, which attaches importance to number of persons scores, a user mode in which a user defines weights can be included in the best-shot reproduction mode.

Next, in step S802, for instance, the memory control unit 505 determines whether the best-shot reproduction mode has been changed. If the best-shot reproduction mode has been changed as the result of determination of step S802 (YES in step S802), the process proceeds to step S803.

In step S803, for instance, the memory control unit 505 makes setting to change the weights which are used when the desirability scores are calculated by the desirability score calculation unit 507, namely, to change the weights for the face recognition scores in the image information table 310.

Then, in step S804, first, the desirability score calculation unit 507 calculates desirability scores of all images recorded in the flash memory 506, based on the weights changed in step S803. Then, the memory control unit 505 updates the image information table 310, based on the desirability scores calculated by the desirability score calculation unit 507, and the best-shot table and image selection unit 508 updates the best-shot table 320. After that, the process proceeds to step S805.

On the other hand, if the best-shot reproduction mode has not been changed as the result of determination of step S802 (NO in step S802), the process proceeds to step S805. In step S805, the memory control unit 505 searches for (selects) an image whose desirability score is the highest from among a plurality of images recorded in the flash memory 506, using the best-shot table 320.

Then, in step S806, the memory control unit 505 displays the image which was obtained in step S805, on the display device 510 and whose desirability score is the highest, via the image decoding unit 509 as a best-shot image.

Then, in step S807, the best-shot table and image selection unit 508 acquires a user's key operation information as to the next display image. The key operation information acquired in this process is the operation information of other best-shots selection key 610 or the time adjustment key 620 as illustrated in FIG. 6.

Next, in step S808, the best-shot table and image selection unit 508 determines whether the key operation information acquired in step S807 is information of the other best-shots selection key 610 or the time adjustment key 620.

If the acquired key operation information is information of the time adjustment key 620 as the result of determination of step S808 (TIME ADJUSTMENT in step S808), the process proceeds to step S809. If the acquired key operation information is information of the other best-shots selection key 610 (OTHER BEST-SHOT in step S808), the process proceeds to step S810.

In step S809, the memory control unit 505 reads the temporally preceding and the subsequent images which are not best-shot images, as to the image currently displayed on the display device 510, from the flash memory 506, and performs control to display these images on the display device 510.

On the other hand, in step S810, the memory control unit 505 searches for (selects) best-shot images of one lower rank (or upper rank) than the best-shot images under display in decreasing order of desirability scores, from among images recorded in the flash memory 506, using the best-shot table 320.

Next, in step S811, the memory control unit 505 displays the best-shot images searched in step S810, on the display device 510 via the image decoding unit 509.

When the process of step S809 or step S811 is completed, the process proceeds to step S812, the best-shot table and image selection unit 508 determines whether an image display onto the display device 510 is continued, based on an operation input from a user.

If the image display is continued as the result of determination of step S812 (YES in step S812), the process returns to step S807, and step S807 and subsequent processes are performed again. On the other hand, if the image display is not continued as the result of determination of step S812 (NO in step S812), the process ends.

In this way, selection (search) of the best-shot images can be performed through a simple processing for referring to the best-shot table 320, by providing the best-shot table 320 beforehand. And, the display of the best-shot images can be performed at a very high speed. Further, the operation of the other best-shot selection key 610 enables shifting for display only between the best-shots. That is, the shifting to and display of other best-shots can be performed by very few key operations.

Next, a second exemplary embodiment will be described. The second exemplary embodiment is provided with a particular person display mode which uses only recognition results of particular objects (human objects) as desirability scores.

More specifically, the second exemplary embodiment has a function to authenticate whether a person in an image is a particular person by comparing a face recognition parameter extracted from among images with a face recognition parameter for particular person beforehand registered. Then, desirability scores in the second exemplary embodiment are calculated using the face recognition results (smile scores, size scores) of the particular person authenticated. In addition, the present exemplary embodiment is not specialized to a particular authentication algorithm, and any authentication algorithm can be adopted. By using only the results of the particular person authenticated in this way, for instance, smiles or the like of children of owner of digital camera or photographer can be also employed as a measure to evaluate best-shots.

In the second exemplary embodiment, the configuration thereof is the same as the configuration of the first exemplary embodiment as described above, except for the contents of the recognition of the recognition unit 503 as illustrated in FIG. 5, and the image information table 310 and the best-shot table 320 as illustrated in FIG. 3. The recognition unit 503 according to the second exemplary embodiment performs an authentication of the particular person, calculates quantitatively smile scores, number of persons scores, frontality scores in captured images, as well as smiles and sizes of the images of only authenticated particular person as scores, and then records them on the image information table.

FIG. 9 illustrates an example of the image information table 910, and the best-shot table 920 associated with a particular person, in the second exemplary embodiment. The image information table 910 has size scores and smile scores of the particular person added to column items thereof, compared with the image information table 310 according to the first exemplary embodiment as illustrated in FIG. 3. Further, when the particular person display mode is selected, weights are assigned to only smile scores and size scores of the particular person, in the creation of the best-shot table 920. At this time, weights for other scores (face recognition scores as illustrated in FIG. 3) are set to zero, which will not be reflected on the desirability scores.

When the particular person display mode is selected, desirability scores are calculated from only scores pertaining to the authenticated particular person, as illustrated in FIG. 9, and best-shot images in the particular person display mode are selected using local maximum value information of calculated desirability scores. As a result, when a plurality of objects appears in a photo, for instance, "when my child appears large" or "when my child appears smiling" can be defined as best-shots.

Next, a third exemplary embodiment will be described. The third exemplary embodiment is different from the first exemplary embodiment in terms of system configuration of a digital camera to which the exemplary embodiment is applied as the image processing apparatus 10.

Figure 10:
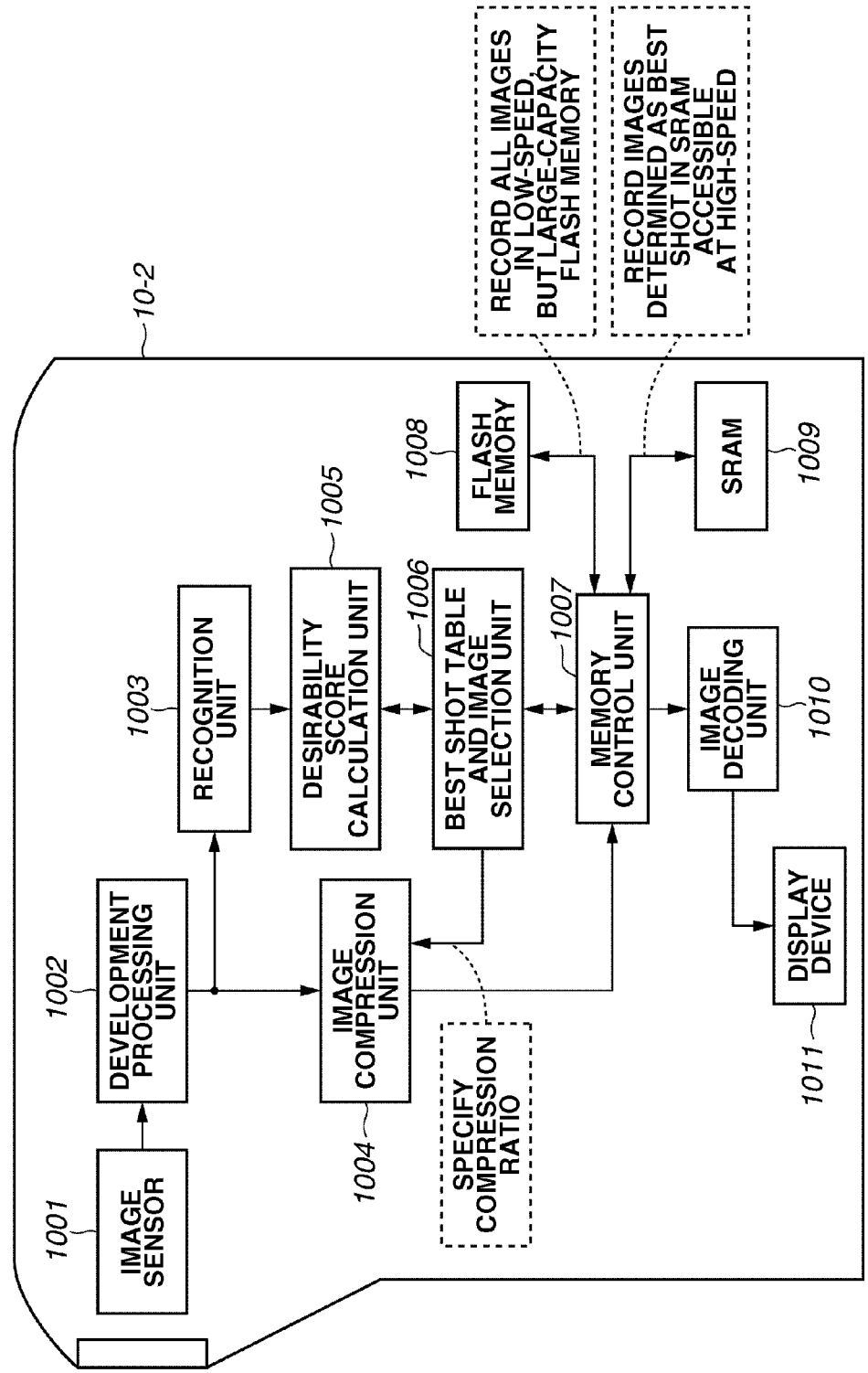
FIG. 10 illustrates an example of system configuration of a digital camera according to a third exemplary embodiment.

FIG. 10 illustrates an example of system configuration of a digital camera 10-2 according to the third exemplary embodiment. As illustrated in FIG. 10, the digital camera 10-2 includes an imaging sensor 1001, a development processing unit 1002, a recognition unit 1003, an image compression unit 1004, a desirability score calculation unit 1005, and a best-shot table and image selection unit 1006. Furthermore, the digital camera 10-2 includes a memory control unit 1007, a flash memory 1008, a SRAM 1009, an image decoding unit 1010, and a display device 1011.

In the present exemplary embodiment, the imaging sensor 1001 corresponds to the imaging sensor 17 as illustrated in FIG. 1, the display device 1011 corresponds to the display device 16 as illustrated in FIG. 1. Further, the development processing unit 1002, the recognition unit 1003, the image compression unit 1004, the desirability score calculation unit 1005, the memory control unit 1007, and the image decoding unit 1010 are realized by the CPU 11 executing the program 13a of the ROM 13 as illustrated in FIG. 1. Further, for instance, the flash memory 1008 and the static random access memory (SRAM) 1009 are utilized as the external memory 14 of FIG. 1. Further, the best-shot table and image selection unit 1006 includes, for instance, the CPU 11 and the program 13a of the ROM 13, and the external memory 14 and the input device 15 as illustrated in FIG. 1.

The imaging sensor 1001, the development processing unit 1002, the recognition unit 1003, the image compression unit 1004, and the desirability score calculation unit 1005 perform the same processes as those of the imaging sensor 501, the development processing unit 502, the recognition unit 503, the image compression unit 504 and the desirability score calculation unit 507 of FIG. 5, respectively.

The best-shot table and image selection unit 1006 sets weights for desirability score calculation depending on a photographing mode which is set by a user before beginning image capturing. Then, in the desirability score calculation unit 1005, the calculation of the desirability scores is performed, using smile scores, number of persons scores and frontality scores acquired during image capturing, and weights which have been set. Further, the best-shot table 320 is also created at the same time by the processes of the flowcharts illustrated in FIG. 2A and FIG. 2B.

The memory control unit 1007 controls the recording of images which have been subjected to compression by the image compression unit 1004, as well as image information (additional information) associated with the images, which is input from the best-shot table and image selection unit 1006, on the flash memory 1008 as an image information table. Furthermore, the memory control unit 1007 controls reading out of information of the best-shot table and the reading out of compressed images corresponding to the best-shots from the flash memory 1008, and storing (reproducing) of them in the SRAM 1009.

The SRAM 1009 is a recording memory, and its recording capacity is smaller than that of the flash memory 1008. However, as its characteristic, processing time of the SRAM 1009 required to write and read is shorter than that of the flash memory 1008. That is, the SRAM 1009 is a storage medium which enables higher-speed access than the flash memory 1008. In the present exemplary embodiment, best-shot images to be read out when an image display is performed in the best-shot display mode are all saved in the SRAM 1009. Accordingly, the best-shot images can be readout and displayed at a higher speed, so that operation response of users can be improved.

Further, all images and the image information table have been previously recorded in the flash memory 1008. Therefore, when the temporally preceding and subsequent images to a best-shot are displayed by, for instance, the time adjustment key, all images which are not best-shots can be also read out and displayed at a normal speed. Further, since information of the image information table associated with all images has been previously saved in the flash memory 1008, desirability scores and the best-shot table can be changed even after image capturing. Further, when a display mode (photographing mode) is changed, information of the image information table is read out from the flash memory 1008, and the best-shot table is updated depending on weights corresponding to an updated mode. Furthermore, in this case, a file of the best-shot images to be stored in the SRAM 1009 is also updated.

Further, in the example as described above, even images which are not best-shots have been all recorded in the flash memory 1008, but the present exemplary embodiment is not necessarily limited to this form. When there is no memory allowance in the capacity of the flash memory 1008, such methods are feasible, for instance, that record only images registered in the best-shot table, or record images whose desirability scores are equal to or greater than a threshold value.

Furthermore, in the present exemplary embodiment, images registered in the best-shot table can be stored by varying compression ratios of images from the images not registered in the best-shot table. More specifically, images not registered in the best-shot table may be recorded with a higher image quality, by lowering the compression ratios of images registered in the best-shot table (including the case where no compression is performed) compared with the images not registered in the best-shot table. Further, according to the present exemplary embodiment, a plurality of storage media consisting of the flash memory 1008 and the SRAM 1009 is provided as the external memory 14 of FIG. 1. As a substitute for this, however, a plurality of storage areas which correspond to the plurality of storage media may be provided inside the external memory 14.

Next, a fourth exemplary embodiment will be described. In the first to the third exemplary embodiments as described above, mainly, a configuration suitable for cameras for shooting still images has been described. In the fourth exemplary embodiment, a configuration suitable for cameras for shooting moving images which select and use highlight scenes among moving images will be described. In the present exemplary embodiment, "highlight scene" means the most typical frame image among a series of moving images as a still image, and has substantially the same meaning as "best-shot" which has been described in the first to the third exemplary embodiments. In the fourth exemplary embodiment, description will be given below using the wording of highlight scene as a substitute for best-shot.

Figure 11:
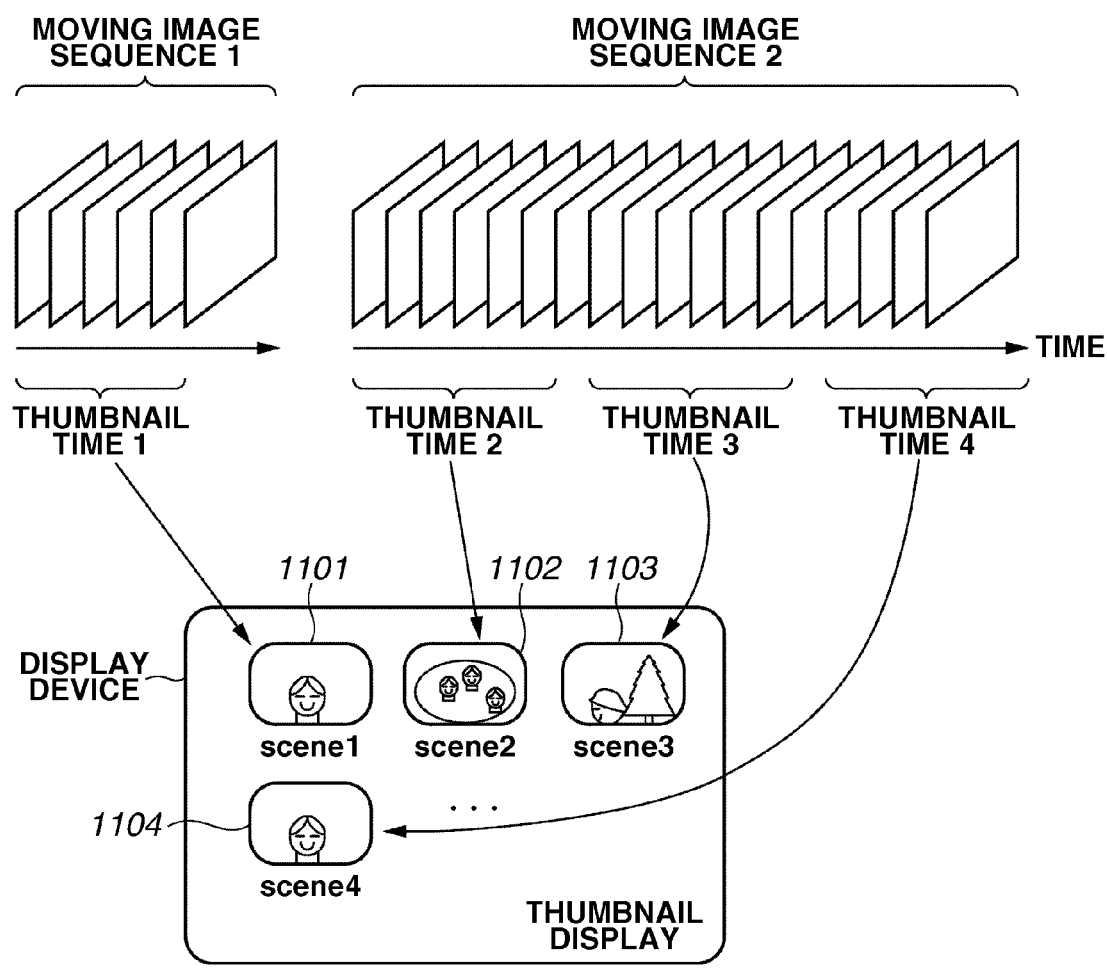
FIG. 11 illustrates an example of a concept to select an image of a highlight scene from among moving images and perform a thumbnail display in a fourth exemplary embodiment.

FIG. 11 illustrates the fourth exemplary embodiment, and illustrates an example concept for selecting images of highlight scenes from among moving images, and performing a thumbnail display.

Thumbnail images in moving images are generated by selecting one scene out of the entire scenes, for instance, out of moving images shot in a short period of time (e.g., a moving image sequence 1 of FIG. 11). Further, the thumbnail images in the moving images are generated, in a case of moving images (e.g., a moving image sequence 2 of FIG. 11) shot in a relatively long period of time, by automatically dividing the moving images for each predefined period of time. Each of the divided images is labeled as a chapter, and generated for each period of time. In FIG. 11, the moving image sequence 2 is divided into three periods of time consisting of thumbnail time periods 2, 3, 4, and thumbnail images corresponding to respective time periods are generated.

In FIG. 11, a thumbnail image 1101 of a scene 1 in the display device is displayed corresponding to a thumbnail time period 1 of the moving image sequence 1. Further, a thumbnail image 1102 of a scene 2, a thumbnail image 1103 of a scene 3 and a thumbnail image 1104 of a scene 4 are displayed corresponding to the thumbnail time period 2, the thumbnail time period 3 and the thumbnail time period 4 of the moving image sequence 2, respectively.

Figure 12:
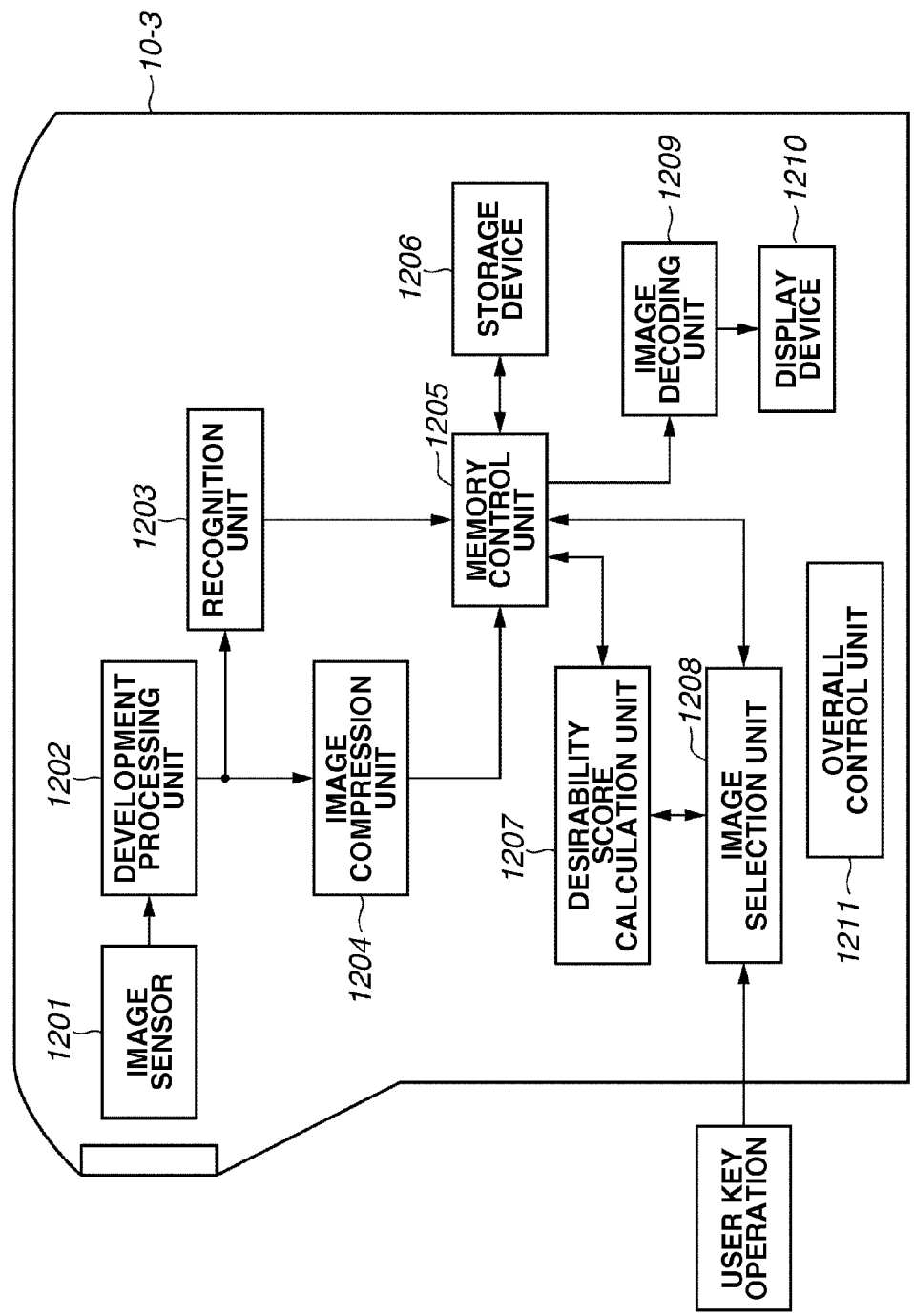
FIG. 12 illustrates an example of system configuration of a video camera according to the fourth exemplary embodiment.

FIG. 12 illustrates an example of system configuration of the video camera 10-3 according to the fourth exemplary embodiment. This video camera 10-3 is a camera for shooting moving images. As illustrated in FIG. 12, the video camera 10-3 includes an imaging sensor 1201, a development processing unit 1202, a recognition unit 1203, an image compression unit 1204, a memory control unit 1205, and a storage apparatus 1206. Furthermore, the video camera 10-3 includes a desirability score calculation unit 1207, an image selection unit 1208, an image decoding unit 1209, a display device 1210, and an overall control unit 1211.

In the present exemplary embodiment, the imaging sensor 1201 corresponds to the imaging sensor 17 as illustrated in FIG. 1, and the display device 1210 corresponds to the display device 16 as illustrated in FIG. 1. Further, the development processing unit 1202, the recognition unit 1203, the image compression unit 1204, the memory control unit 1205, the desirability score calculation unit 1207, the image decoding unit 1209, and the overall control unit 1211, as illustrated in FIG. 12 are realized by the CPU 11 as illustrated in FIG. 1 executing the program 13a. Further, the storage apparatus 1206 is configured of, for instance, the external memory 14 of FIG. 1. Further, the image selection unit 1208 of FIG. 12 includes, for instance, the CPU 11 and the program 13a, and the input device 15 as illustrated in FIG. 1.

In the description hereinbelow, only configuration which is different from the configuration illustrated in FIG. 5 will be described. The storage apparatus 1206, which is configured to store moving images, is capable of storing a longer-time and large-capacity image data, compared with the flash memory 506 of the digital camera 10-1 according to the first exemplary embodiment. In the present exemplary embodiment, the storage apparatus 1206 is a device for storing the moving images on the media, such as a detachable memory card, or a DVD, tape, etc., or, a large-capacity hard disk or a large-capacity flash memory. Further, in a video camera 10-3, an overall control unit 1211 for performing control of an overall operation of the video camera is also provided. Further, in the present exemplary embodiment, a highlight scene table is provided as a substitute for the best-shot table in the first to the third exemplary embodiments. This is because, as described above, in the present exemplary embodiment, a wording of highlight scene is used as a substitute for a best-shot. The basic configuration thereof is the same as the best-shot table, as described above. Further, the highlight scene table is recorded, for instance, in the storage apparatus 1206.

Figure 13:
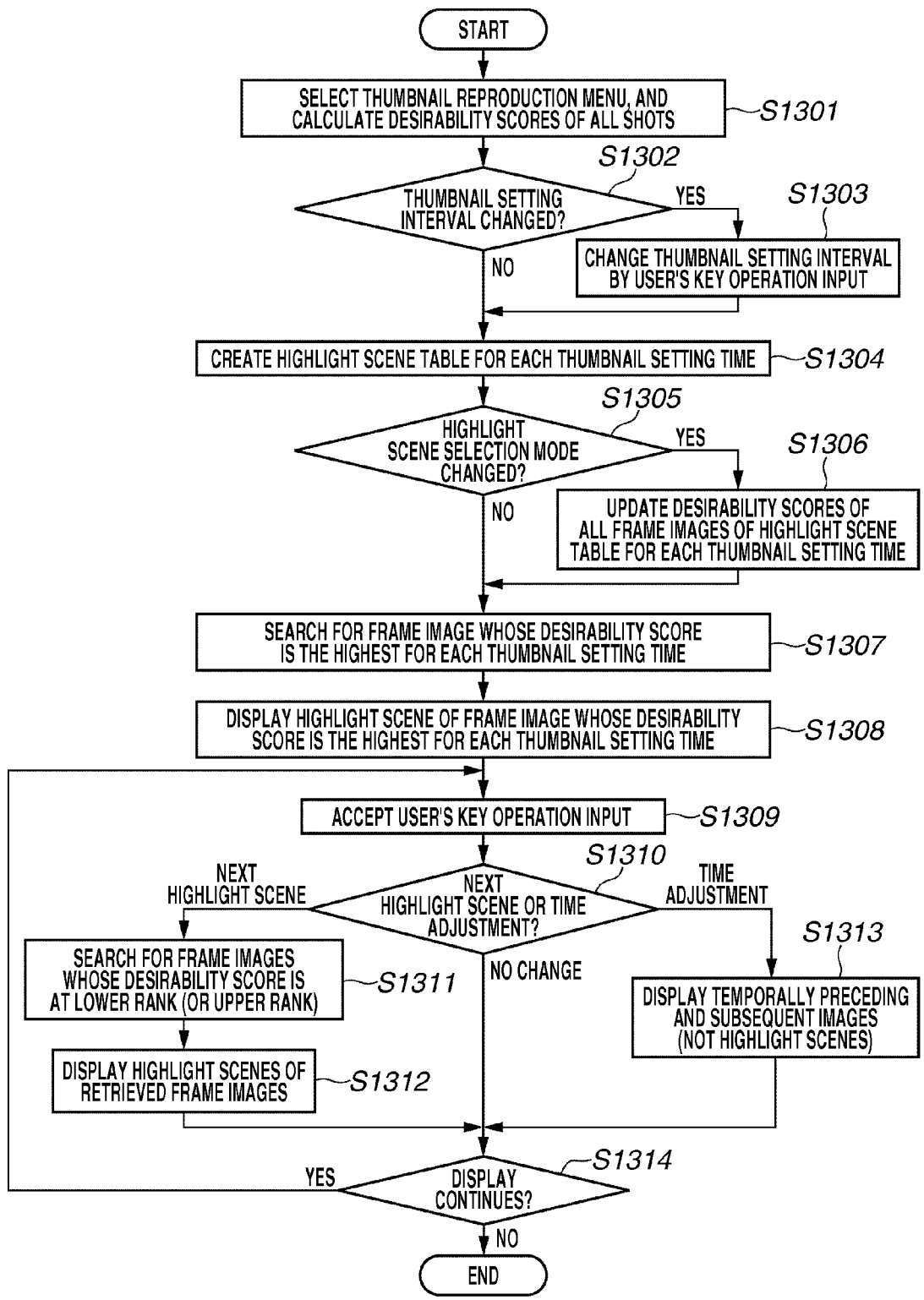
FIG. 13 is a flowchart illustrating an example of processing for displaying an image of a video camera according to the fourth exemplary embodiment.

FIG. 13 is a flowchart illustrating an example of procedure of an image display processing of the video camera 10-3 according to the fourth exemplary embodiment. FIG. 13 illustrates how to apply the above-described image selection algorithm, when thumbnail images are displayed. The processes of the flowchart are performed, mainly, based on the control of the overall control unit 1211, and executed by respective configuration units of the video camera 10-3 operating based on the control of the overall control unit 1211 as the need arises. Additionally, similar to the first exemplary embodiment, in the present exemplary embodiment, respective scores used when selecting images of highlight scenes, have been evaluated and calculated beforehand during moving image capturing, and have been already set as information (image information) of respective scores for each one frame image of the moving images.

First, when a thumbnail reproduction menu is selected by a user, in step S1301, the overall control unit 1211 recognizes this menu. Then, the overall control unit 1211 issues instructions to calculate desirability scores for each frame image of the moving images, to the desirability score calculation unit 1207. As a consequence, the desirability score calculation unit 1207 calculates the desirability scores for each frame image of the moving images. As an alternative form, a recognition of step S1301 may be performed, for instance, by the image selection unit 1208.

Then, in step S1302, the overall control unit 1211, for instance, determines whether there is a request for change of a thumbnail setting interval by key operation of a user. If moving image sequence continues for relatively long period of time, as illustrated in FIG. 11, a function to automatically divide moving images is used for each predefined period of time. At this time, by the determination it is confirmed whether the divided time period agrees with the interval which the user seeks. The determination of step S1302 may be carried out, for instance, by the image selection unit 1208. If there is a request for change of the thumbnail setting interval as the result of determination of step S1302, (YES in step S1302), the process proceeds to step S1303.

In step S1303, the overall control unit 1211, for instance, sets a change of the thumbnail setting interval based on the key operation input of the user. As an alternative form, the process of step S1302 may be performed, for instance, by the image selection unit 1208. In this process, the thumbnail setting interval corresponds to a predetermined time interval within the range of a time-sequence, in a plurality of images (moving images) captured in a time-sequential manner.

If the process of step S1303 is completed, or, if it is determined in step S1302 that there is no request for change of the thumbnail setting interval (NO in step S1302), the process proceeds to step S1304. In step S1304, the overall control unit 1211 creates an entry of the highlight scene table for each thumbnail setting time period which was set up, and creates the highlight scene table using the image selection algorithm as illustrated in the first exemplary embodiment.

After that, in step S1305, the overall control unit 1211 determines whether the highlight scene selection mode has been changed. If the highlight scene selection mode has been changed as the result of determination step S1305 (YES in step S1305), the process proceeds to step S1306. In step S1306, the overall control unit 1211 updates desirability scores of all shots (all frame images) of the highlight scene table for each thumbnail setting time period. As an alternative form, the processing of step S1306 may be performed, for instance, by the memory control unit 1205.

If the processing of step S1306 is completed, or, if it is determined that the highlight scene selection mode is not changed in step S1305 (NO in step S1305), the process proceeds to step S1307. In step S1307, the overall control unit 1211 searches (selects) for a frame image whose desirability score is the highest, for each thumbnail setting time period, based on the current highlight scene table. As an alternative form, the processing of step S1306 may be performed, for instance, by the memory control unit 1205.

Next, in step S1308, the memory control unit 1205 selects the frame image searched in step S1307, based on the control of the overall control unit 1211, from the storage apparatus 1206 as a highlight scene image. Then, the memory control unit 1205 displays the frame images selected as thumbnail images on the display device 1210, as illustrated in FIG. 11.

Then, in step S1309, the overall control unit 1211, for instance, accepts a key operation input from a user. More specifically, if the user, after seeing a displayed thumbnail image, determines that the image is not preferable, provides instructions to the image selection unit 1208 by the key operation, selects the next highlight scene, or selects other frame images which are in the temporally preceding-and-subsequent relationship, or performs other operations.

Then, in step S1310, the overall control unit 1211 determines whether the next highlight scene selection key or the time adjustment key has been operated by the user. The determination of step S1310 may also be performed, for instance, in the image selection unit 1208.

If the next highlight scene selection key is operated by the user as the result of determination of step S1310 (NEXT HIGHLIGHT SCENE in step S1310), the process proceeds to step S1311. When the process proceeds to step S1311, the overall control unit 1211, for instance, searches for a frame image whose desirability score is one rank lower (or one rank higher) from among frame images recorded in the storage apparatus 1206, using the highlight scene table.

Then, in step S1312, the memory control unit 1205, for instance, selects the frame images searched in step S1311 from the storage apparatus 1206, based on the control of the overall control unit 1211. Then the memory control unit 1205, for instance, displays the selected frame images on the display device 1210 as thumbnail images.

Further, if the time adjustment key has been operated by the user as the result of determination of step S1310 (TIME ADJUSTMENT in step S1310), the process proceeds to step S1313. In step S1313, the memory control unit 505 reads out temporally preceding and subsequent images as to a currently displayed image from the storage apparatus 1206, and displays them on the display device 1210.

If the processing of step S1312 or step S1313 is completed, or, it is determined that there is no key operation from the user in step S1310 (NO CHANGE in step in S1310), the process proceeds to step S1314. In step S1314, the overall control unit 1211, for instance, determines whether the image display on the display device 1210 is to be continued based on the operation input from the user. If the image display is to be continued as the result of the determination (YES in step S1314), the process returns to step S1309, and the processes of step S1309 and later are again performed. On the other hand, if the image display is not to be continued as the result of determination of step S1314 (NO in step S1314), the process ends.

Next, a fifth exemplary embodiment will be described. In the first to the fourth exemplary embodiments as described above, an image processing system is operated in one device, but the present invention is also applicable to a form in which a plurality of devices constitutes the image processing system. Now, in the fifth exemplary embodiment, the processing is performed according to the fourth exemplary embodiment as a precondition. However, the processes in the first to the third exemplary embodiments can also be performed.

In the fifth exemplary embodiment, the image selection algorithm is operated on the display control apparatus independent of the video camera. The highlight scenes are selected from among moving images and utilized for the thumbnail display. Hereinbelow, description will be given with reference to FIG. 14 illustrating an example configuration of the image processing system, and FIG. 13 referred to in the fourth exemplary embodiment.

Figure 14:
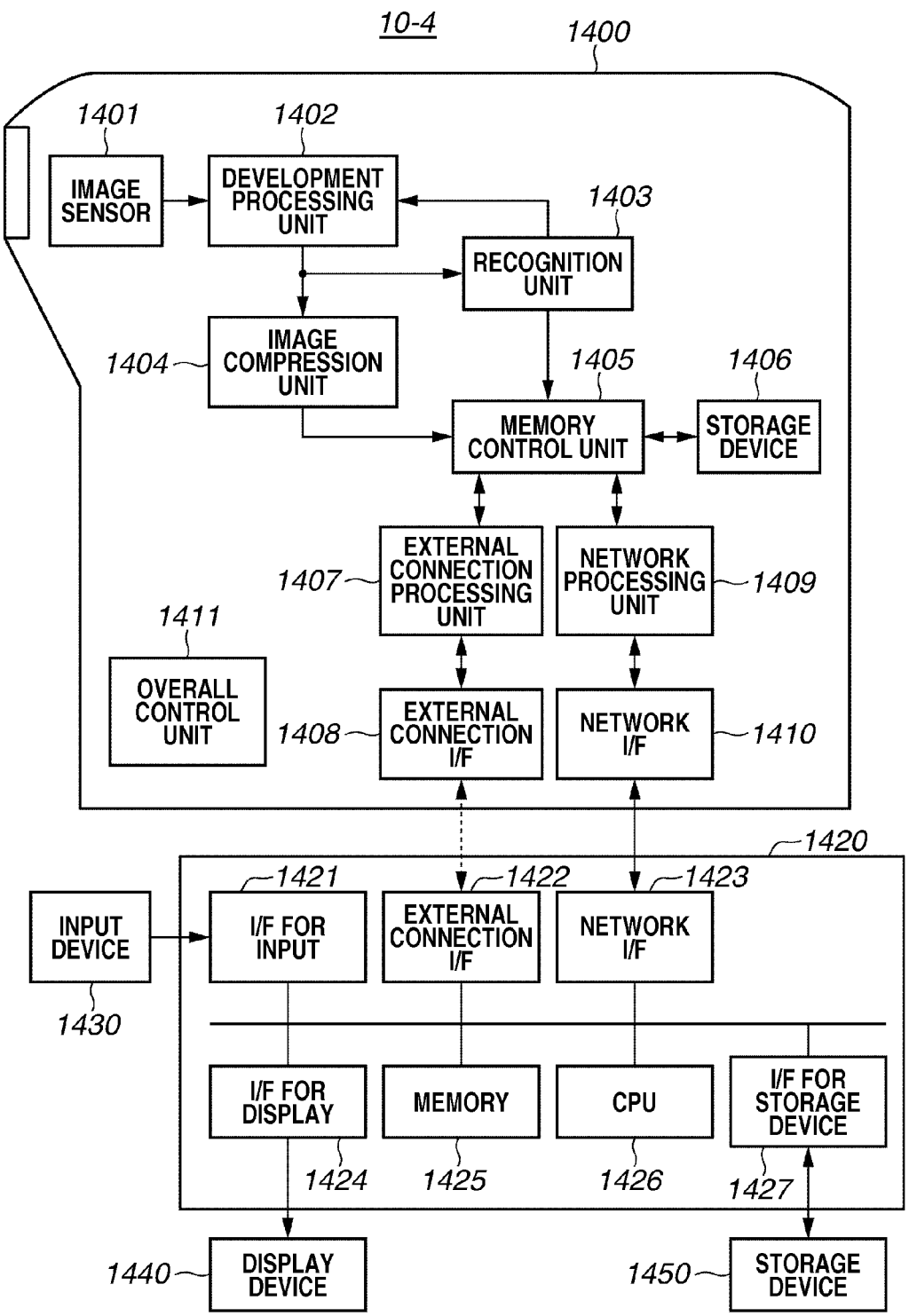
FIG. 14 illustrates an example of system configuration of an image processing apparatus according to a fifth exemplary embodiment.

FIG. 14 illustrates an example of system configuration of an image processing system 10-4 according to the fifth exemplary embodiment. As illustrated in FIG. 14, the image processing system 10-4 includes a video camera 1400, a display control apparatus 1420, an input device 1430, a display device 1440, and a storage device 1450.

The video camera 1400 includes an imaging sensor 1401, a development processing unit 1402, a recognition unit 1403, an image compression unit 1404, a memory control unit 1405, and a storage apparatus 1406. Furthermore, the video camera 1400 includes an external connection processing unit 1407, an external connection I/F 1408, a network processing unit 1409, a network I/F 1410, an overall control unit 1411. In this configuration, the video camera 1400 corresponds to the video camera 10-3 as illustrated in FIG. 12.

In the video camera 1400, difference from the video camera 10-3 as illustrated in FIG. 12 is that functions of the desirability score calculation unit 1207, the image selection unit 1208, and the image decoding unit 1209 as illustrated in FIG. 12 are executed on the display control apparatus 1420 side. Further, in the video camera 1400, difference from the video camera 10-3 as illustrated in FIG. 12 is that the video camera 1400 is provided with the network processing unit 1409 and the network I/F 1410, and is connected with the display control apparatus 1420 via the network I/F 1410. For the network I/F 1410, wired local area network (LAN) is to be employed here, but connections via wireless LAN or public line network may be acceptable. Furthermore, in the video camera 1400, difference from the video camera 10-3 as illustrated in FIG. 12 is that the video camera 1400 is provided with the external connection processing unit 1407 and the external connection I/F 1408. The external connection I/F 1408 in the configuration is configured to provide one-to-one connection typified by a universal serial bus (USB) or Institute of Electrical and Electronics Engineers (IEEE) 1394. Then, the video camera 1400 and the display control apparatus 1420 can be also connected with each other as illustrated with a dotted line in the figure via the external connection I/F 1408.

The video camera 1400 can provide captured image data and image information (in the example, score information in each frame and the like) in the image data to the display control apparatus 1420 via the network I/F 1410 or the external connection I/F 1408. When sending image data and image information in the image data from the video camera 1400 to the display control apparatus 1420, the devices may not operate in cooperation with each other at the same time. In this case, detachable storage media (memory card, DVD, tape, etc.) in the storage apparatus 1406 of the video camera 1400, can be directly used as the storage device 1450. Accordingly, the display control apparatus 1420 can utilize image data and image information of the image data, from the storage device 1450 via an I/F 1427 for the storage device.

The display control apparatus 1420 has the functions of the desirability score calculation unit 1207, the image selection unit 1208, and the image decoding unit 1209 as illustrated in FIG. 12, generates thumbnail images as the need arises, and controls the display of them on the display device 1440. The display control apparatus 1420 can include personal computers (PCs), but may also include reproduction devices of dedicated DVDs and video tapes.

The display control apparatus 1420 includes an I/F 1421 for inputting, an external connection I/F 1422, a network I/F 1423, an I/F 1424 for display, a memory 1425, a CPU 1426, and an I/F 1427 for storage device.

The display control apparatus 1420 acquires data of captured moving images and image information in each frame image of the moving images from the video camera 1400, via the external connection I/F 1422, the network I/F 1423 and the I/F 1427 for storage device. The CPU 1426 temporarily stores moving image data acquired from the video camera 1400 in the memory 1425. Then, the CPU 1426 performs calculation of desirability scores in the fourth exemplary embodiment, based on the image information (including the image information table) acquired from the video camera 1400 and input information which has been input from the input device 1430 via the I/F 1421 for inputting. After that, the CPU 1426 creates a highlight scene table in the fourth exemplary embodiment, based on calculated desirability scores or the like. Then, the CPU 1426 reads out necessary frame images from the memory 1425 using the highlight scene table, subjects them to image decoding or the like, and subsequently displays them as thumbnail images on the display device 1440 via the I/F 1424 for display.

Further, input by a user for changing the contents of the image display in the display device 1440 is transmitted to the CPU 1426 via the I/F 1421 for inputting from the input device 1430 such as a key board and a mouse. The CPU 1426 performs proper processing in response to the user's request.

Hereinbelow, specific processing in the display control apparatus 1420 will be described. In the fifth exemplary embodiment, the processing of a flowchart as illustrated in FIG. 13 is mainly executed by the control of the CPU 1426 of the display control apparatus 1420 (calculation of desirability scores is also implemented by the CPU 1426). A program executed by the CPU 1426 is stored, for instance, in the memory 1425.

Similarly, the processing with respect to the user input performed by the image selection unit 1208 of FIG. 12, in the fifth exemplary embodiment, can be replaced with the processing at the I/F for input 1421 which receives an input from the input device 1430 and the CPU 1426 which has received the input. Further, the processing of the image decoding unit 1209 of FIG. 12 can be replaced with the processing at the CPU 1426, which is as described above. Further, the display device 1210 of FIG. 12 is replaced with the display device 1440 connected via the I/F for display 1424.

As described above, the processes as illustrated in the flowchart of FIG. 13 can also be implemented in the configuration of FIG. 14 by substituting the processing unit. Further, if the image selection algorithm described in the first exemplary embodiment is applied, the CPU 1426 executes an operation using a program stored in the memory 1425. Since the contents of these processes have been described in respective exemplary embodiments as already described above, the descriptions thereof will be omitted here.

As described above, according to respective exemplary embodiments, best-shot images which are desirable for a user can be efficiently selected. In other words, a plurality of best-shot images which has varying contents can be efficiently selected.

More specifically, the best-shot images can be selected at a high speed, or, by less operations. Furthermore, display target image groups in which desirability scores are local maximum values have been stored beforehand in a high-speed accessible storage medium. Thereby, time required for the image display can be shortened. Further, in a moving image display system and a moving image thumbnail creation system using the image selection algorithm, images of highlight scenes can be automatically selected, and thumbnail image groups in the images of the highlight scenes can be created at a high speed.

In addition, the present invention can be also implemented by causing the CPU to read out from a computer-readable storage medium and to execute program codes of software for implementing the functions of the above-described exemplary embodiments. Furthermore, the present invention can be also implemented by an operating system (OS) or the like performing apart or the whole of the processing, based on instructions of the read out program codes.

While the present invention has been described with reference to the exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2008-191304 filed Jul. 24, 2008, which is hereby incorporated by reference herein in its entirety.

What is claimed is:

1. An image processing apparatus comprising:
a calculation unit configured to calculate, for each of a series of images captured in a time-sequential manner, a desirability score that indicates desirability of the image; and
a selection unit configured to select a plurality of images in which the desirability scores are respectively local maximum values in the time-sequence, from the series of images
wherein when the selection unit selects a new image of which the desirability score is the local maximum value, the selection unit compares the desirability scores of the new image and a previously selected image if a time interval between the new image and the previously selected image in the time-sequence is equal to or less than a predetermined time threshold value, and
the selection unit prohibits selection of the new image, if the desirability score of the new image is not higher than that of the previously selected image.

2. The image processing apparatus according to claim 1, wherein the selection unit selects images in which the desirability scores are local maximum values in the time-sequence, and are larger than a predetermined score threshold value.

3. The image processing apparatus according to claim 1, wherein the selection unit selects images in which the desirability scores are local maximum values in the time-sequence, and time intervals from other local maximum values in the time-sequence are larger than a predetermined time threshold value.

4. The image processing apparatus according to claim 1, wherein when the selection unit selects the new image of which the desirability score is the local maximum value, the selection unit selects the new image as a substitute for the previously selected image, if the desirability score of the previously selected image is lower than that of the new image.

5. The image processing apparatus according to claim 1, wherein the calculation unit calculates the desirability scores of respective images based on recognition results of the images.

6. The image processing apparatus according to claim 5, wherein the calculation unit calculates the desirability scores of respective images, based on at least one of smiles of persons scores, number of persons scores, and frontalities of the person scores, which are obtained from results of face recognition processing of the images.

7. The image processing apparatus according to claim 1, further comprising a display control unit configured to display a display image selected by the selection unit on the display device.

8. The image processing apparatus according to claim 1, further comprising a storage control unit configured to store an image selected by the selection unit and other images at different compression ratios.

9. An image processing method comprising:
calculating a desirability score which indicates a desirability of the image, for each of a series of images captured in a time-sequential manner; and
selecting a plurality of images in which the desirability scores are local maximum values in the time-sequence, from the series of images,
wherein when selecting a new image of which the desirability score is the local maximum value, the desirability scores of the new image and a previously selected image are compared if a time interval between the new image and the previously selected image in the time-sequence is equal to or less than a predetermined time threshold value, and selecting a new image is prohibited, if the desirability score of the new image is not higher than that of the previously selected image.

10. A non-transitory computer-readable storage medium that stores a program for instructing a computer to implement image processing, the method comprising:
calculating a desirability score which indicates a desirability of the image, for each of a series of images captured in a time-sequential manner; and
selecting a plurality of images in which the desirability scores are local maximum values in the time-sequence, from the series of images,
wherein when selecting a new image of which the desirability score is the local maximum value, the desirability scores of the new image and a previously selected image are compared if a time interval between the new image and the previously selected image in the time-sequence is equal to or less than a predetermined time threshold value, and selecting a new image is prohibited, if the desirability score of the new image is not higher than that of the previously selected image.

* * * * *